United States Patent [19]
Yada et al.

[11] Patent Number: 5,828,510
[45] Date of Patent: Oct. 27, 1998

[54] MAGNETIC DISK RECORDING AND PLAYBACK APPARATUS USING INDEPENDENTLY FORMED RECORDED PATTERN SETS FOR CLOCK GENERATION

[75] Inventors: Hiroaki Yada; Nobuhiro Hayashi; Takamichi Yamakoshi, all of Kanagawa; Munekatsu Fukuyama, Tokyo, all of Japan

[73] Assignee: Sony Corporation, Tokyo, Japan

[21] Appl. No.: 800,551

[22] Filed: Feb. 18, 1997

Related U.S. Application Data

[60] Continuation of Ser. No. 467,853, Jun. 6, 1995, abandoned, which is a division of Ser. No. 134,375, Oct. 12, 1993, abandoned.

[30] Foreign Application Priority Data

Oct. 14, 1992 [JP] Japan ................................ 4-276165
Oct. 19, 1992 [JP] Japan ................................ 4-280014

[51] Int. Cl.⁶ ........................................... G11B 5/09
[52] U.S. Cl. ................................. 360/51; 360/48
[58] Field of Search ................... 360/31, 45, 46, 360/48, 51, 53, 62, 121, 77.08, 77.11; 358/337, 339, 320

[56] References Cited

U.S. PATENT DOCUMENTS

| | | | |
|---|---|---|---|
| 4,134,126 | 1/1979 | Hirai | 360/34.1 |
| 4,432,026 | 2/1984 | Coleman, Jr. | 360/77.14 |
| 4,553,177 | 11/1985 | Scholich | 360/121 |
| 4,556,967 | 12/1985 | Braat | 360/48 |
| 4,561,028 | 12/1985 | Guisinger | 360/77.08 |
| 4,935,835 | 6/1990 | Godwin et al. | 360/77.07 |
| 5,060,088 | 10/1991 | Dolivo et al. | 360/46 |
| 5,182,740 | 1/1993 | Mizokami et al. | 369/47 |
| 5,212,604 | 5/1993 | Ogura et al. | 360/77.11 |
| 5,255,128 | 10/1993 | Inoue et al. | 360/51 |
| 5,255,136 | 10/1993 | Machado et al. | 360/77.08 |
| 5,260,703 | 11/1993 | Nguyen et al. | 341/100 |
| 5,293,276 | 3/1994 | Dunn et al. | 360/51 |
| 5,341,249 | 8/1994 | Abbott et al. | 360/46 |
| 5,367,411 | 11/1994 | Nishiyama et al. | 360/66 |
| 5,412,516 | 5/1995 | Kennedy et al. | 360/62 |
| 5,414,692 | 5/1995 | Aoki | 369/275.3 |
| 5,475,540 | 12/1995 | Gold | 360/48 |

FOREIGN PATENT DOCUMENTS

| | | |
|---|---|---|
| 0 251 274 A2 | 1/1988 | European Pat. Off. . |
| 0 251 277 AX | 1/1988 | European Pat. Off. . |
| 60-232795 | 11/1985 | Japan . |
| 3-201643 A | 3/1991 | Japan . |
| 2 026 288 | 1/1980 | United Kingdom . |

OTHER PUBLICATIONS

Finn Jorgensen, The complete Handbook of Magnetic Recording 3RD Edition, McGraw Hill, pp. 199–204, 1988.
Patent Abstracts of Japan, vol. 14, No. 534, (P1135), Nov. 26, 1990, & JP2–226535.
Patent Abstracts of Japan, vol. 15, No. 495, (P1288), Nov. 26, 1990, JP3–214429.
Patent Abstracts of Japan, vol. 15, No. 465, (P1138), Nov. 26, 1991, & JP3–201643.
Proceeding VLSI and Computer Peripherals, F. Dolivo, pp. 1–91, May 8–12, 1989.

*Primary Examiner*—Aristotelis M. Psitos
*Assistant Examiner*—Larry T. Cullen
*Attorney, Agent, or Firm*—Limbach & Limbach L.L.P.

[57] ABSTRACT

A highly reliable magnetic record playback apparatus utilizes an independent magnetic clock pattern region and a pattern set region to provide a common timing reference between a data recording region and its adjacent tracks. In the apparatus, the pattern set region provides a reference point so that the circumferential location of the magnetic pattern region can be determined. In one embodiment, the apparatus includes elements for playback of reproduced information recorded on a magnetic disk and an arrangement which provides for the generation of a data existing point clock.

18 Claims, 16 Drawing Sheets

INVERTED PHASE

DATA EXISTING POINT PHASE

FIG. 4
PRIOR ART
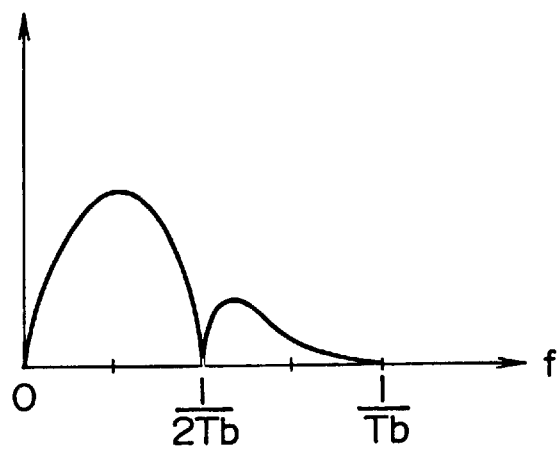
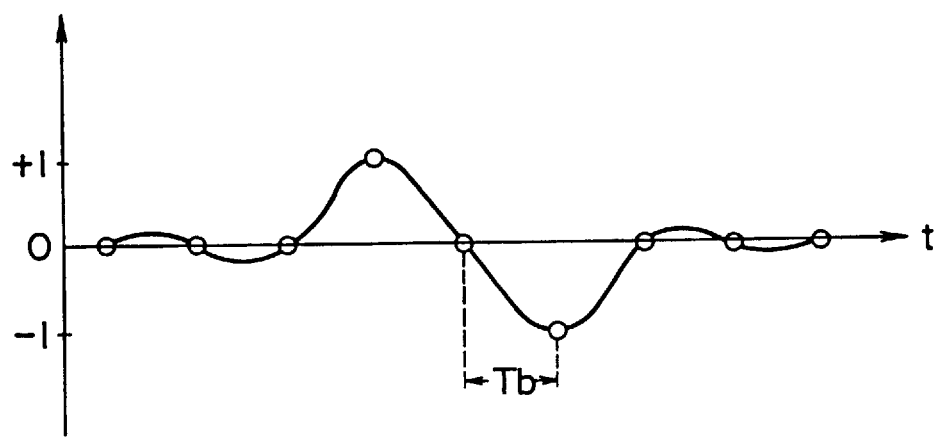

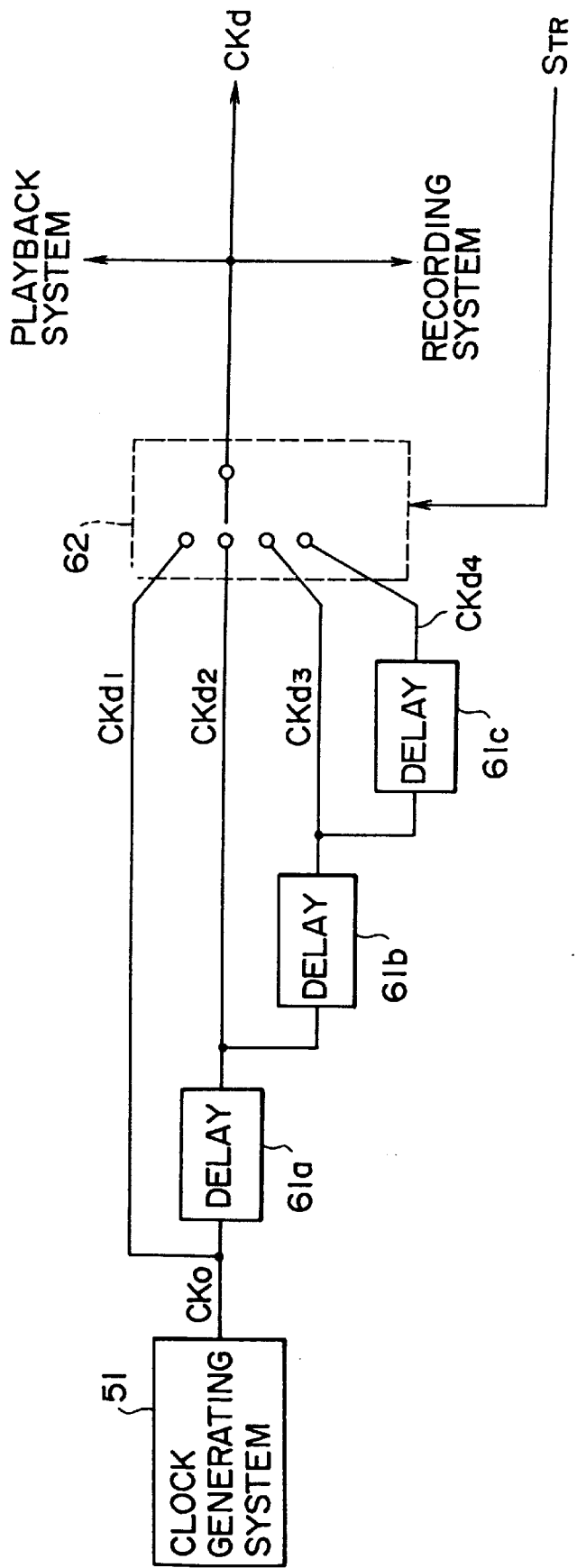
F I G. 13

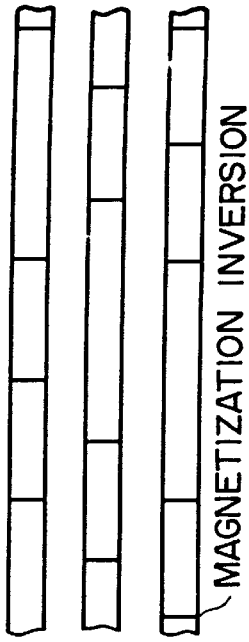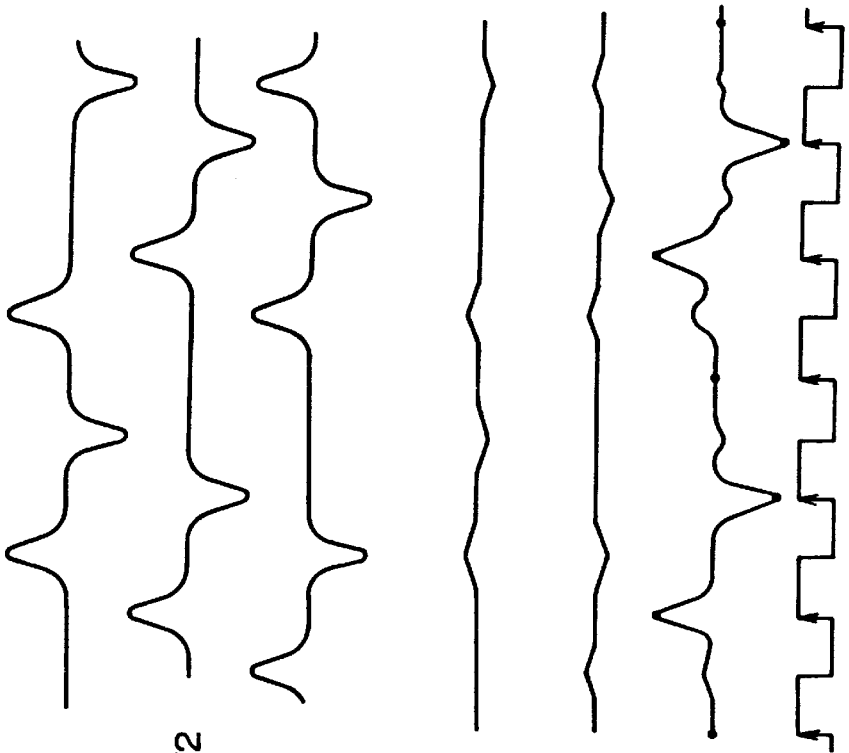

FIG. 14A ADJACENT TRACK T1 (TRACK NUMBER 1)
FIG. 14B PLAYBACK OBJECT TRACK T2 (TRACK NUMBER 2)
FIG. 14C ADJACENT TRACK T3 (TRACK NUMBER 3)
FIG. 14D REPRODUCED SIGNAL OF ADJACENT TRACK T1 (TRACK NUMBER 1)
FIG. 14E REPRODUCED SIGNAL OF PLAYBACK OBJECT TRACK T2 (TRACK NUMBER 2)
FIG. 14F REPRODUCED SIGNAL OF ADJACENT TRACK T3 (TRACK NUMBER 3)
FIG. 14G CROSSTALK FROM TRACK T2 TO T1
FIG. 14H CROSSTALK FROM TRACK T3 TO T2
FIG. 14I REPRODUCED SIGNAL SUPERIMPOSED WITH CROSSTALK
FIG. 14J CKde

F I G. 19
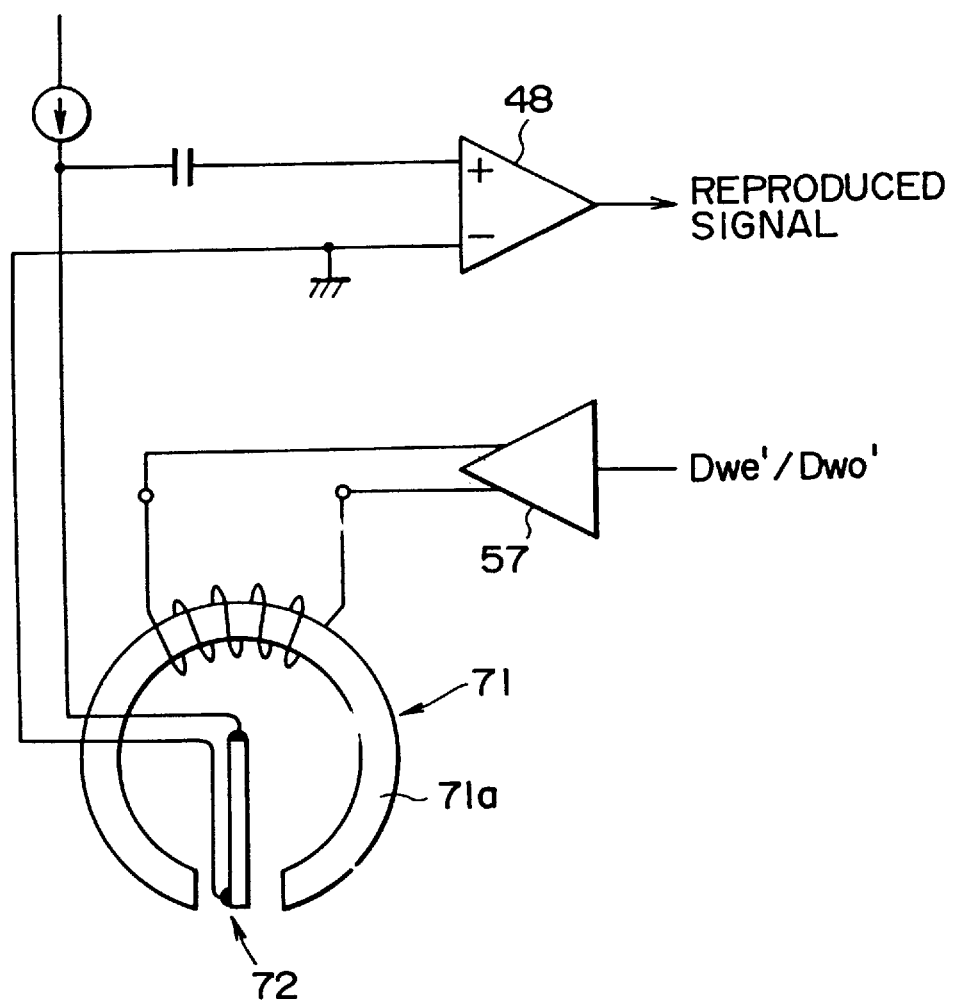

MAGNETIC DISK RECORDING AND PLAYBACK APPARATUS USING INDEPENDENTLY FORMED RECORDED PATTERN SETS FOR CLOCK GENERATION

This is a continuation of application Ser. No. 08/467,853 filed on Jun. 6, 1995, and now abandoned which was a division of application No. Ser. 08/134,375 filed Oct. 12, 1993, now abandoned.

BACKGROUND OF THE INVENTION (1) Field of the Invention

The present invention relates to a magnetic disk apparatus, for example, a hard disk drive.

(2) Description of the Related Art

FIG. 1 illustrates an example of an existing magnetic disk apparatus. In FIG. 1, the reference numeral 1 designates a magnetic disk for recording data; 2, a magnetic heart; 3, a recording/playback selection switch. Concentric recording tracks are formed on the surface of a magnetic disk 1 and each recording track is divided into a plurality of sectors 4.

A sector 4 includes a data region 5 for recording a lump of data and a preamble region 6 provided immediately before the data region to record a repetitive signal. In view of the recording data or the like in the data region 5 and preamble region 6, a recording circuit system consisting of an encoder 14 for channel code and a recording amplifier 13 is constituted. A bit clock of recording data Dw is supplied to the encoder 14 by a crystal-controlled oscillator 15. In the encoder 14 for channel code, data is encoded, for example, by 2-7 RLL and 8-9 conversion.

In the one sector 4, recording is carried out at a time in accordance with an independent fixed clock which is not synchronous with rotation of the magnetic disk 1. Therefore, phases of recording and magnetization pattern on the surface of magnetic disk 1 are not identical between different sectors 4. Therefore, a gap 7 is provided between sectors 4 for allowing jitters. The phases of the magnetization, pattern of the recording data Dw are also not identical, even between the adjacent two recording tracks and the phase relationship is at random.

Moreover, in view of obtaining a playback data Dr from a playback signal of the magnetic head 2, a playback circuit system consisting of a playback amplifier 8, an equalizer 9, PLL 10 for self-clocking, a data detector 11 and a decoder 12 for channel code is constituted.

In general, a clock CKd indicating data existing points is necessary for detecting data from the playback signal in a digital recording/playback apparatus. In the example of FIG. 1, a so-called self-clocking system for obtaining the data existing point clock CKd from a data playback signal itself is introduced. For detection of data of a certain sector 4, PLL 10 for self-clocking is synchronized with the playback signal of the preamble region 6 and after synchronization is established, the synchronized condition is maintained using the playback signal of the data region 5.

In the case of recent magnetic disk apparatuses, a partial response channel (hereinafter, referred to as "PR channel") is used for improving line recording density as a channel modulation and demodulation system. The PR channel includes various classes. (Refer to Kabel P. and Pasupathy S., Partial-Response Signaling, "IEEE Transaction on Communications, Vol. COM-23, No. 9, September 1975".)

The class PR (1,0,–1) (also expressed as class IV, PR-IV, PR-4) is suitable for digital magnetic recording. A line density can be improved and, simultaneously, error rate can also be improved by combining this class with the Viterbi decoding method. (Refer to Kobayashi H., Application of Probablistic Decoding to Digital Magnetic Recording Systems, "IBM J. Res. Develop., Vol. 15, pp. 65–74, July 1970".)

In FIG. 1, a digital magnetic recording and playback channel consisting of a magnetic disk 1 and a magnetic head 2 can be set to the PR (1,0,–1) channel by adjusting the characteristic of the equalizer 9, namely by giving the characteristic of (1+D) to the equalizer 9 (D indicates one bit delay).

However, it is not easy to realize self-clocking based on the PR (1,0,–1) channel output waveform. FIG. 2 is an eye pattern of the PR (1,0,–1) channel. It is also proposed to detect a zero-cross point as a method of extracting clock information from the playback signal waveform. However, as is obvious from FIG. 2, in addition to the zero-cross point 16 at the data existing point phase, the zero-cross point 17 at the phase inverted from such data existing point phase also exists and therefore it is difficult to extract only a unique data existing point phase. It is similar for the PR(1,0,–1) channel output waveform of FIG. 3.

FIG. 4 shows an isolated waveform after equalization and its power spectrum density. In the power spectrum density, a frequency element which is equal to a channel bit rate (1/Tb) or the frequency element which is equal to one-half thereof (½Tb) does not exist, and it is not easy to perform self-clocking on the frequency axis.

For this reason, a signal waveform has first been temporarily detected in the PLL 10 for self-clocking, and in accordance with the result of detection, only the waveform including clock information is extracted. Moreover, the data has already been encoded to a binary channel code before recording so that the clock information is often included in the waveform after equalization. The decoder 12 and encoder 14 in FIG. 1 are provided as the processing circuit for the purpose explained above.

The existing magnetic disk apparatus described above has the following problems because it has introduced the self-clocking system:

i) A complicated and large scale clock reproducing PLL circuit is required in order to conduct difficult extraction of the clock from the PR channel output waveform.

ii) Since the clock has been generated on the basis of the reproduced waveform depending on data content, accuracy of the clock at the data existing point is rather low and it causes error rate deterioration at the time of detecting data.

iii) To enable self-clocking, channel encoding for limiting zero run-length of recording data is required and redundancy added thereby, reducing the quantity of effective recording information on the disk surface.

The magnetic disk apparatus shown in FIG. 1 has the following problems because data recording is carried out depending on the bit clock of the fixed frequency generated by the crystal-controlled oscillator 15 which is not synchronous with rotation of magnetic disk 1.

Namely, as shown in FIG. 5, in the case of reproducing data of a certain track 17, so-called crosstalk 20 between adjacent tracks, wherein the magnetic field 19 generated in the adjacent track 18 migrates into the data of track 17, is generated thereby deteriorating the quality of the playback signal of the relevant track 17. This crosstalk 20 causes a problem when the width of guard band 21 is small and impedes a high recording density of the digital magnetic recording apparatus. In the magnetic disk apparatus shown in FIG. 1, phase difference of magnetization pattern between the adjacent tracks is random as explained above, and there has been no effective method to eliminate crosstalk 20.

OBJECT AND SUMMARY OF THE INVENTION

It is an object of the present invention to provide a highly reliable magnetic disk apparatus having a large storage capacity which has overcome the problems explained above and effectively generates a high precision data existing point clock.

It is another object of the present invention to provide a digital magnetic recording and playback apparatus which eases cross-talk between adjacent tracks, reduces error of reproduced data, and improves recording density by reducing the width of the guard bands.

It is a further object of the present invention to provide a digital signal recording apparatus, wherein the data recording region and the clock information recording region are formed independently within the same track, recording and playback are alternately switched in the data recording mode, changeover to playback from recording mode can be done at a high speed, gap length is reduced between the clock information recording region and the data region, thereby improving recording density.

To achieve the objects explained above, according to the first aspect of the present invention, there is provided a magnetic disk apparatus comprising:

a magnetic disk having a magnetic clock pattern for providing the timing criterion which is common to the data recording region and adjacent tracks, and an independent pattern set region for identifying the position of the magnetic clock pattern in the circumferential direction, a playback means for reproducing information stored in the magnetic disk, a clock generating means for generating a data existing point clock using playback signals of the magnetic clock pattern region and pattern set region of the magnetic disk, and a data detecting means for detecting data from a playback signal of the data region of the magnetic disk in accordance with the data existing point clock generated by the clock generating means.

According to the second aspect of the present invention, there is provided a magnetic disk apparatus comprising:

a magnetic disk having a magnetic clock pattern for providing the timing criterion which is common to the data recording region and adjacent tracks, and an independent pattern set region for identifying the position of the magnetic clock pattern in the circumferential direction, a playback means for reproducing information stored in the magnetic disk, a first clock generating means for generating a data existing point clock using playback signals from the magnetic clock pattern region and the pattern set region of the magnetic disk, a second clock generating means for generating a second data existing point clock, having a constant phase difference for each adjacent track from the data existing point clock generated by the first clock generating means, and a data detecting means for detecting data from a playback signal from the data region of the magnetic disk synchronously with the second data existing point clock, generated by the second clock generating means.

According to the third aspect of the present invention, there is provided a magnetic disk apparatus comprising;

a magnetic disk having a magnetic clock pattern for providing the timing criterion which is common to the data recording region and adjacent tracks, and an independent pattern set region for identifying the position of the magnetic clock pattern in the circumferential direction, a magnetic recording head for recording data on the magnetic disk, a magnetic playback head which is individually provided in addition to the magnetic recording head to reproduce data from the magnetic disk, a clock generating means for generating a data existing point clock using playback signals of the magnetic clock pattern region and the pattern set region of the magnetic disk, a timing signal generating means for generating a timing signal for recording data from the data existing point clock, generated by the clock generating means, a data detecting means for detecting data from a playback signal of the data region of the magnetic disk synchronously with the data existing point clock, generated by the clock generating means, a synchronous means for synchronizing data to be recorded with the data existing point clock generated by the clock generating means, a first delay means for delaying the timing signal for the time difference generated at least depending on the distance between the playback head and recording head, a second delay means for delaying the data synchronized with the data existing point clock for the time difference generated at least depending on the distance between the playback head and the recording head, and a recording means for driving the recording head synchronously with the timing signal delayed by the first delay means to record the data delayed by the second delay means into the data recording region.

BRIEF DESCRIPTION OF THE DRAWING

FIG. 4 illustrates an isolated waveform after equalization in the PR(1,0,−1) channel and its power spectrum density.

FIG. 13 illustrates an example of another constitution of a phase control circuit 60 of the embodiment 2;

FIGS. 14a–j are diagrams for explaining cross-talk between adjacent tracks in the embodiment 2;

FIG. 19 illustrates an example of the constitution of an integrated recording and playback head.

DETAILED DESCRIPTION OF THE PREFERRED EMBODIMENTS

With reference to the drawings, embodiments of the present invention will be explained hereunder.

(1) Channel Modulation and Demodulation System

The channel modulation and demodulation system will be first explained.

In this embodiment the partial response PRS, (1,0,−1) is used as the channel modulation and demodulation system.

The partial response PRS (1,0,−1) itself has the property to transmit an error and may cause a destructive error when a one bit error is generated under a certain condition. In order to prevent such error, it is essential to conduct the preceding before data is stored. This preceding may be realized by executing inverse conversion of the partial response. In the case of PRS (1,0,−1), the characteristic of preceding can be obtained as $1/(1-D^2)$.

Figure 6:
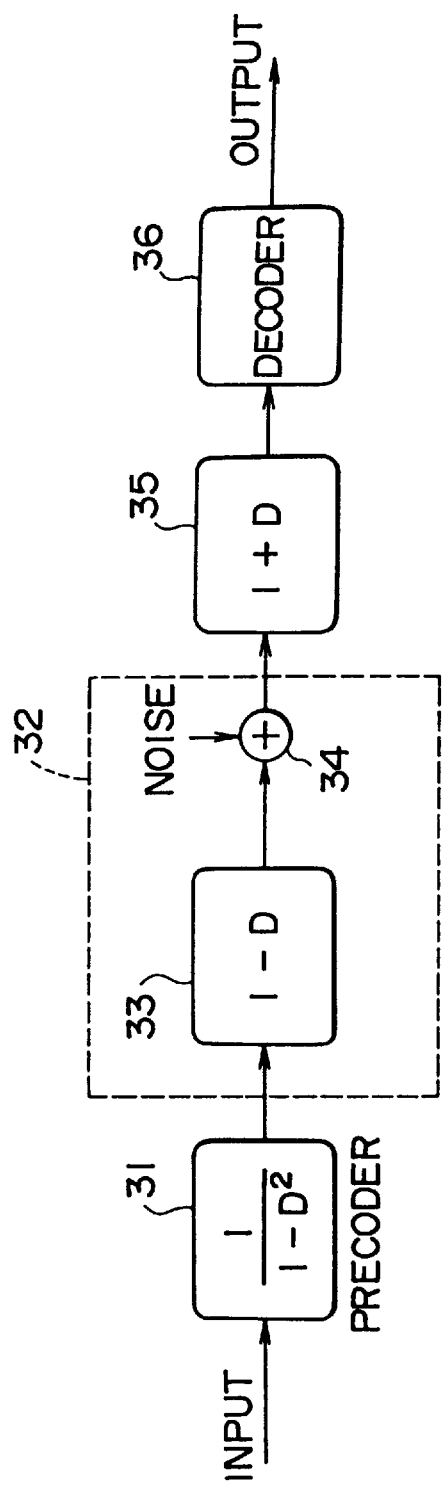
FIG. 6 illustrates an example of constitution of a recording and playback system utilizing PR(1,0,−1)

FIG. 6 illustrates an over all constitution of the system for modulation and demodulation of the partial response class IV by the preceding explained above.

In FIG. 6. a precoder 31 executes, as explained above, the processing of $1/(1-D^2)$.

Recording data is converted, by this precoder 31, to precoded data which changes between the values 1 and −1 of the recorded data by making use of the correlation between data of recorded data and is thereafter outputted to a recording channel circuit 32.

The recording channel circuit 32 is not provided specially, but functions as an equivalent circuit of those commonly found in a magnetic recording and playback system. In this circuit (namely, when data is magnetically recorded and is then reproduced), the arithmetic processing of (1−D) is executed for an output of the precoder 31 by an arithmetic operation circuit 33.

In this case, noise generated in the magnetic recording channel is processed as the element added to the result of arithmetic operation by an adder 34 and the data including such noise element (data reproduced after the magnetic recording) is outputted to an arithmetic operation circuit 35 in the successive stage. The arithmetic operation circuit 35 executes arithmetic operation of (1+D) for an output from the recording channel circuit 32.

Figure 7:
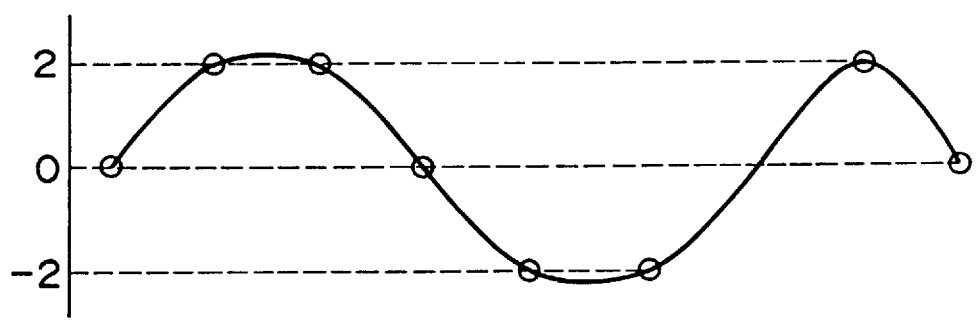
FIG. 7 is a diagram illustrating change of signal level.

The signal outputted from the recording channel circuit 32 takes any one level among three levels of {−2, 0, +2} as shown in FIG. 7, when the range of signal level is defined as ±2. For the decoding of this signal to the initial binary data (1 or 0), the 3-value level detecting method using a fixed threshold value and viterbi decoding as the maximum likelihood decoding method are available.

In the 3-value level detecting method, the threshold levels respectively having predetermined fixed values, are set between the values 0 and +2 and between the values 0 and −2 and the decoding is carried out depending on whether a sample point is larger or smaller than the threshold level. Therefore, this method is advantageous because circuit constitution is simplified, but it is disadvantageous because detecting capability is comparatively lower.

On the-other hand, in the maximum likelihood decoding (for example, viterbi decoding), data is decoded also using values of the front and rear sample points and the highest likelihood series is estimated by detecting a data series (path) obtained as a result of decoding. This method has a higher detecting capability-than the 3-value level detecting method. Therefore, when the same data is decoded, a bit error rate of this method can be improved by one to two digits.

(2) Description of Embodiment 1

Figure 8:
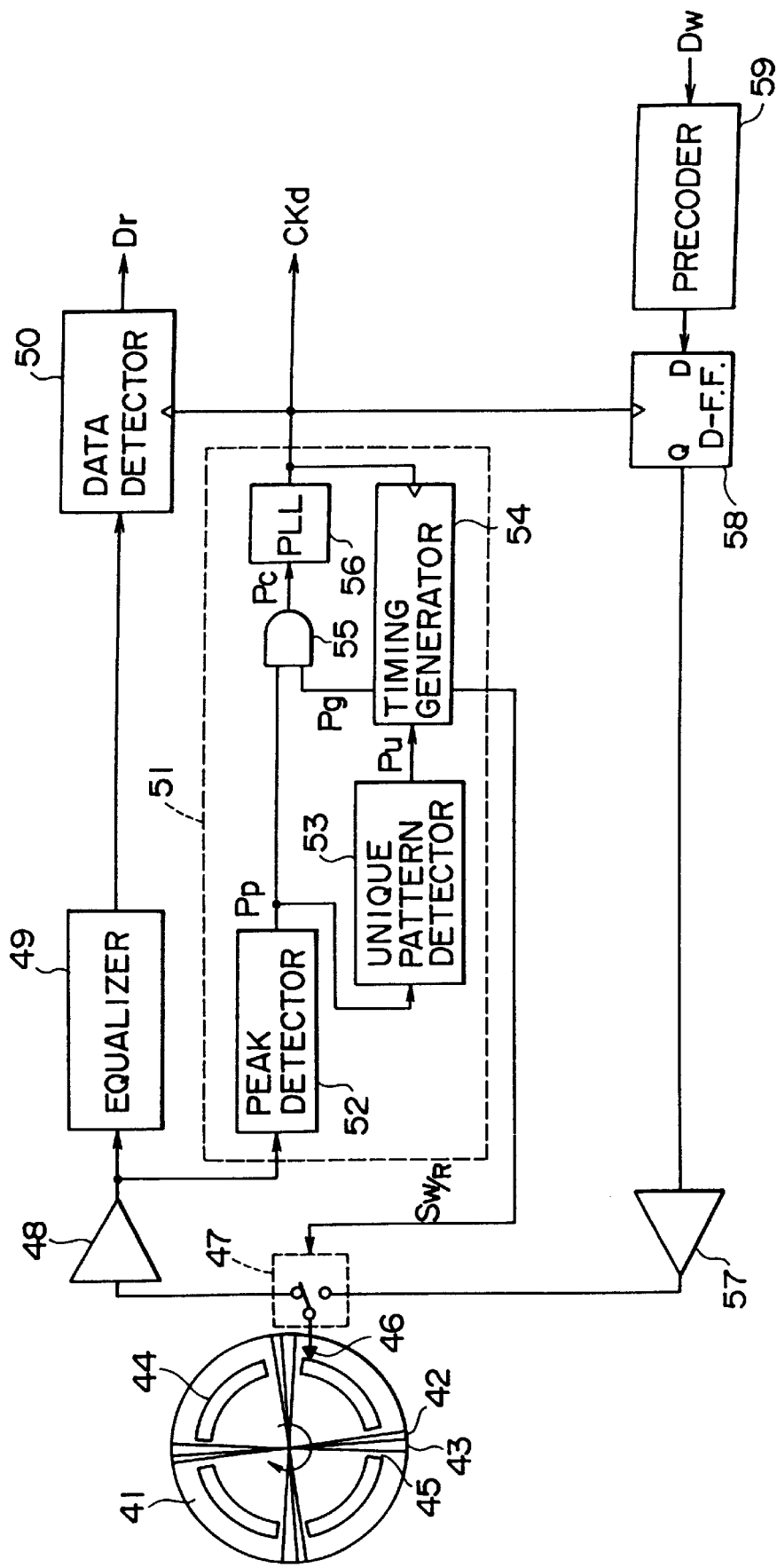
FIG. 8 illustrates a constitution indicating an embodiment 1 of the present invention.

In FIG. 8, continuous magnetic clock pattern 42 and unique pattern 43 are provided radially on a magnetic disk 41 to generate a data existing point clock CKd. A data segment 44 is provided as a data recording region between these patterns 42, 43. In order to generate a high precision clock, magnetic clock pattern 42 and unique pattern 43 are provided from about several hundreds to several thousands in total number per track at equal intervals.

Figure 9:
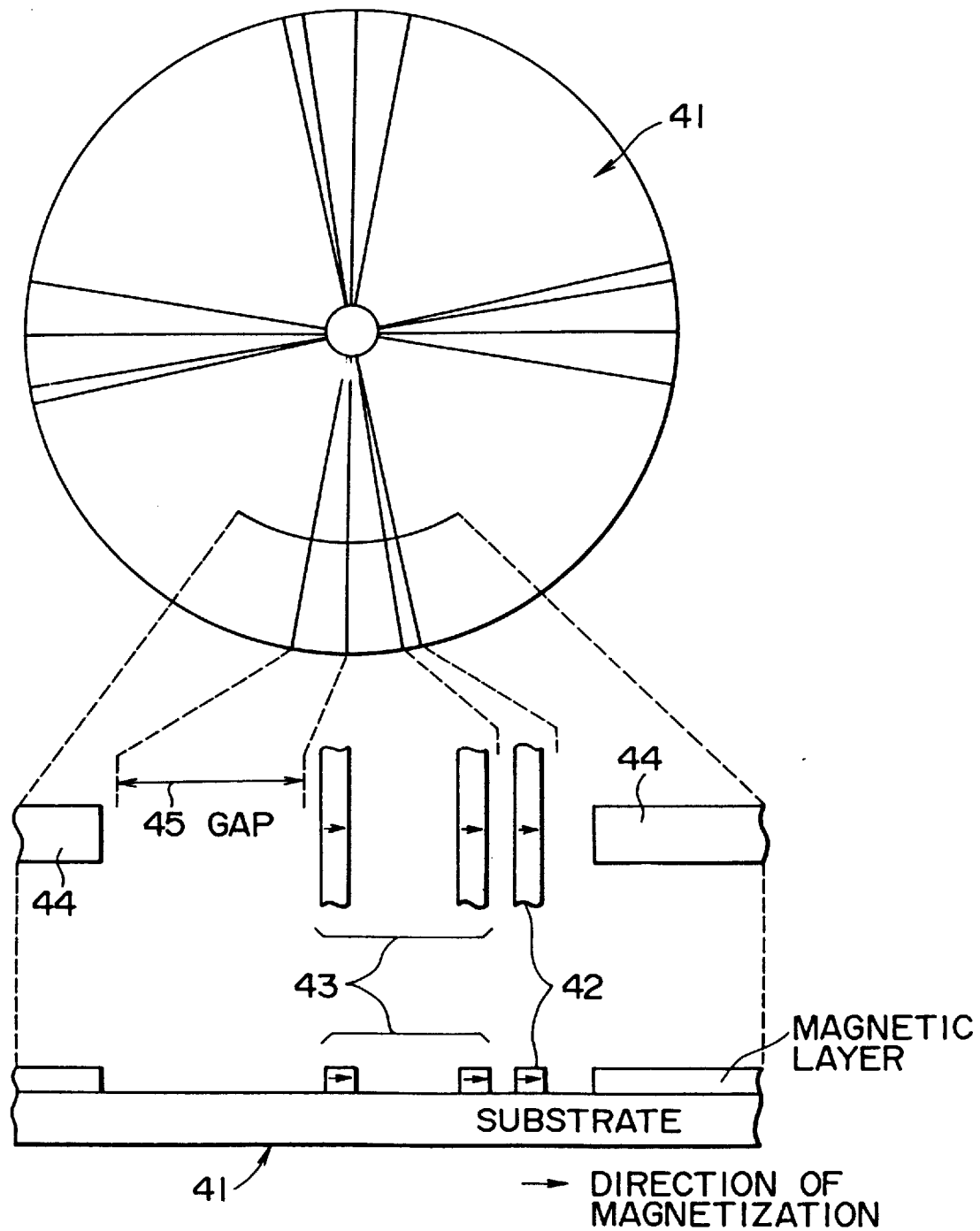
FIG. 9 illustrates an enlarged view and sectional view of the region near the unique pattern and clock pattern.

FIG. 9 illustrates an enlarged view and a sectional view of the region near the one magnetic clock pattern 42 and unique pattern 43. A part of the magnetic layer is removed by an appropriate method such as etching or the like to form a pattern independent of data segment 44. The magnetic clock pattern 42 and unique pattern 43 are formed by magnetizing such pattern in the one direction (magnetizing direction is indicated by an arrow mark) with a DC current through a magnetic head.

When these patterns are reproduced with the magnetic head, isolated waveforms are reproduced at the front and rear edges of the patterns. The unique pattern 43 is a set of several magnetic patterns and a pulse string reproduced therefrom which has the characteristic that it can be easily detected without the help of an accurate clock. The unique pattern 43 allows an estimate existing time (position in the circumferential direction) of the magnetic clock pattern 42 to be determined, and is required particularly in the initial synchronization establishing process, such as the timing when the power switch is turned on.

The clock information synchronized with rotation of the disk can be obtained by detecting the existing time of the peak of the reproduced isolated waveform of the magnetic clock pattern 42.

Returning to FIG. 8, the entire part of the embodiment will be explained.

Data recording/regeneration is carried out by a magnetic head 46 and the operation mode is selected by a recording/regeneration selecting switch 47. A data regenerating circuit system is formed by a playback amplifier 48, an equalizer 49 and a data detector 50 and playback data Dr is outputted from the data detector 50.

Moreover, a clock generating circuit 51 generates a data existing point clock CKd synchronized with rotation of disk from a playback signal of the unique pattern 43 and magnetic clock pattern 42 and this data existing point clock CKd is then supplied to a data detector 50 and a D-flipflop 58.

Figure 10:
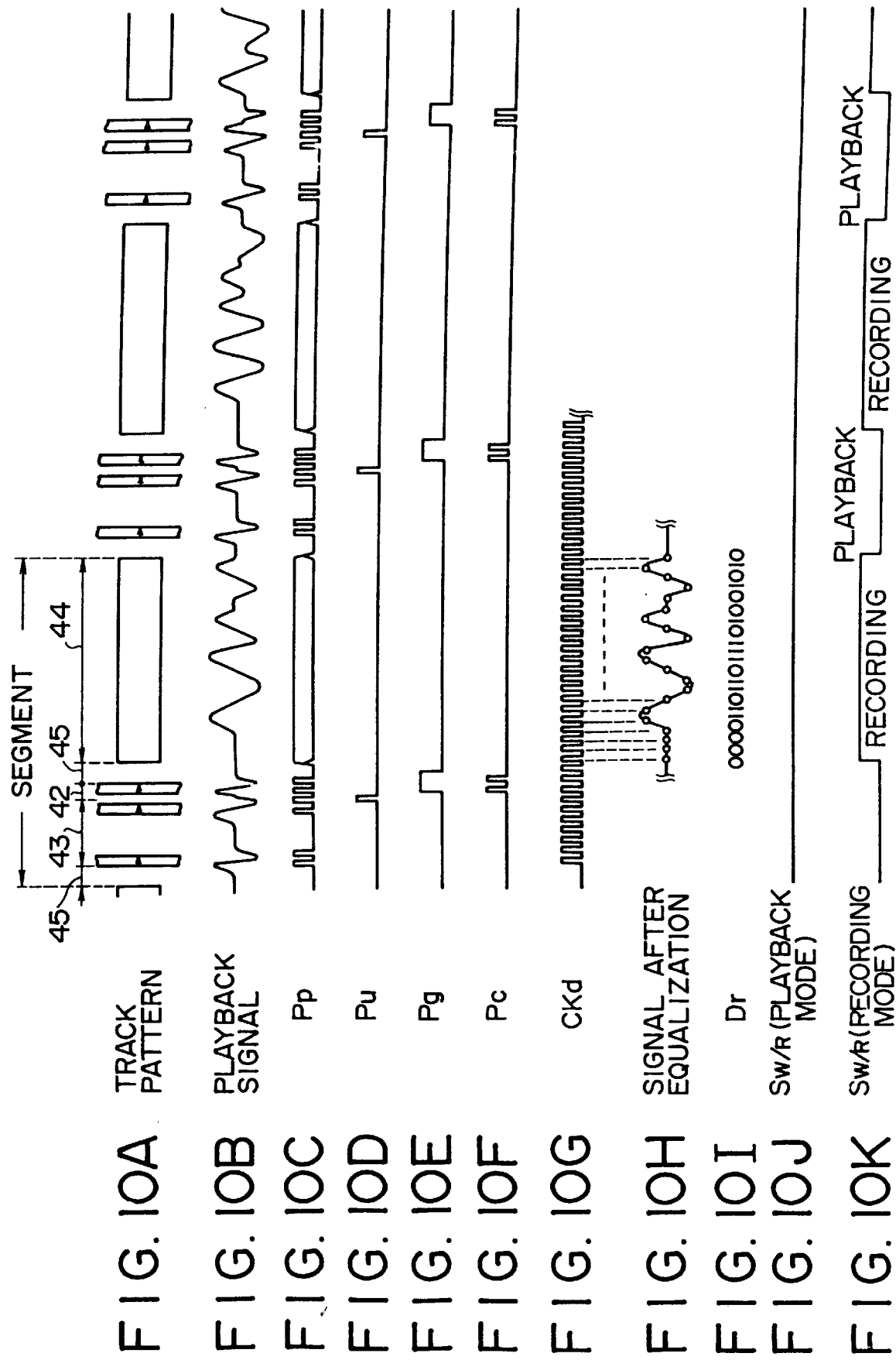
FIGS. 10a–k illustrate operation timings in the data playback mode and data recording mode of the embodiment 1.

The clock generating operation in the data playback mode will be explained by referring to FIG. 8 and FIG. 10.

In FIG. 10A, a part of the concentric tracks on the surface of a disk is shown in the form of straight lines to illustrate a track pattern. A track is formed by repetition of a segment consisting of a gap 45, a unique pattern 43, a magnetic clock pattern 42, a gap 45 and a data segment 44.

In the data playback mode, a recording/playback control signal SW/R outputted from a timing generator 54 of the clock generating circuit 51 is always in a low level (illustrated as FIG. 10J) and the magnetic head 46 is permanently connected with the playback amplifier 48 through a selection switch 47.

A playback signal (illustrated as FIG. 10B) outputted from the playback amplifier 48 is supplied to the clock generating circuit 51 to conduct the clock generating operation as explained hereunder. Namely, the playback signal is supplied to a peak detector 52 forming the clock generating circuit 51 to obtain a peak detection pulse Pp corresponding to the isolated waveform (illustrated as FIG. 10C). This detected pulse Pp is supplied to the unique pattern detector 53. The unique pattern detector 53 detects a unique pattern existing time and outputs the unique pattern detecting pulse Pu (illustrated as FIG. 10D). This detected pulse Pu is supplied to the timing generator 54.

The timing generator 54 is a sequencer which operates in synchronization with the, data existing point clock CKd in the period of existing interval of the magnetic clock pattern 42. The internal condition of the timing generator 54 is initialized for each input of the detecting pulse Pu. This timing generator 54 generates the predetermined clock gate pulse Pg (illustrated as FIG. 10E). The gate pulse Pg and the detecting pulse Pp from the peak detector 52 explained above are supplied to an AND circuit 55 which outputs a clock pattern detecting pulse Pc (illustrated as FIG. 10F). This detecting pulse. Pc is formed by removing unnecessary pulses not corresponding to the magnetic clock pattern 42 from the peak detecting pulse Pp sent from the peak detector 52.

The detecting pulse Pc outputted from the AND circuit 55 is supplied to PLL 56 as the synchronization reference signal, and thereby PLL 56 forms the data existing point clock CKd (illustrated as FIG. 10G) synchronized with the detecting pulse Pc including jitter generated by irregular rotation (wow, flutter) of the magnetic disk 41. This clock CKd is supplied to the timing generator 54 to give the internal condition transition time. Moreover, this clock CKd is also supplied to the data detector 50 to indicate the data detection time.

FIG. 10H illustrates a signal after equalization outputted from the equalizer 49. The playback data Dr is illustrated as FIG. 10I by detecting the data in the time of data existing point clock CKd.

Here, the data detector 50 is a general coherent type detector for detecting data with the data existing point clock (bit clock) CKd and good error rate characteristics can be obtained, in addition to the characteristics of the PR channel, by utilizing the viterbi decoder.

Moreover, in the clock generating process explained above, unique pattern detecting pulse Pu is necessary for establishing initial synchronization, but when synchronization is once established, it is not always necessary. The data existing point clock CKd is previously accurately synchronized with each pattern of tracks on the disk surface and therefore if no asynchronization, such as cycle slip, occurs, then the internal condition of the timing generator 41, as the sequencer, always changes in synchronization with the rotation of the disk, even if initialization by the unique pattern detecting pulse Pu is not carried out.

As a result, the clock gate pulse Pg generated by the timing generator 54 always exists on the correct position of the magnetic clock pattern 15 and clock pattern detection is carried out accurately. The data existing point clock CKd is continuously and correctly synchronized with each pattern on the disk surface.

Operation of the data recording mode will now be explained by referring to FIG. 8 and FIG. 10. In this embodiment correct data detecting operation in the data playback mode described above requires recording of the recording data Dw into the data segment 44 almost synchronously with the magnetic clock pattern 42.

Therefore, it is necessary to generate the data existing point clock with the same operation as that explained for the data playback mode even in the data recording mode. First, the timing generator 54 generates a recording/reproduction control signal SW/R (illustrated as FIG. 10K). This control signal SW/R becomes a high level during the period where the position of a magnetic head 46 corresponds to a data segment 44 and becomes low level during the period where the magnetic head 46 position corresponds to the unique pattern 43 and magnetic clock pattern 42. When the control signal SW/R is low level, the magnetic head 46 is connected to the playback amplifier 48 through the selection switch 47. This playback amplifier 8 outputs the playback signals of the unique pattern 43 and magnetic clock pattern 42 and the clock generating circuit 51 generates a data existing point clock CKd, as in the case of the data playback mode explained above.

When the period of unique pattern 43 and magnetic clock pattern 42 has completed the control signal SW/R outputted from the timing generator 54 is changed to the high level for data recording to data segment 44. In this cases the setting of the selection switch 47 is changed over.

The magnetic head 46 is connected to a recording amplifier 57. The precoded recording data Dw is supplied to the magnetic head 46 through a D-flipflop 58 and the recording amplifier 57 to record the recording data Dw into the data segment 44.

When the predetermined period (data existing point clock unit) corresponding to the one data segment has passed, the control signal SW/R outputted from the timing generator 54 becomes the low level again. Thereby, the selection switch 47 is switched and the reproduced signal of the unique pattern 43 and magnetic clock pattern 42 is supplied to the clock generating circuit 51 for continuation of clock generation. Namely, synchronization between the magnetic clock pattern 42 and data existing point clock CKd is maintained in the data recording mode.

In view of allowing for switching time between recording and playback modes (the time required for switching between the operations of the playback amplifier 48 and recording amplifier 57, etc.), a gap is provided between the data segment 44 and magnetic clock pattern 42 and between the data segment 44 and unique pattern 43.

Here, the recording data Dw is recorded by the D-flipflop 58 synchronously with the data existing point clock CKd. Thereby, as a result, the recording data Dw is recorded synchronously with the magnetic clock pattern 42. Accordingly, in the data playback mode, the PR channel data can be detected correctly in the data playback mode by referring to the-data existing point clock CKd generated synchronously with the magnetic clock pattern 42 as explained above.

In above embodiment 1, a magnetic disk apparatus for recording and playback modes has been proposed, but the present invention is also effective for a magnetic disk apparatus only for playback mode which allows data recording at-the time of manufacture and thereafter allows only the data playback-mode in the ordinary use.

Moreover, in above embodiment, the one magnetic clock pattern 42 is defined as the one pattern which is magnetized with a DC current and exists independently, but it may be a set of several magnetized patterns.

In above embodiment 1, the one magnetic clock pattern 42 or unique pattern 43 is formed radially and continuously on the disk surface but it may also be formed intermittently for each track or several tracks.

Moreover, in the embodiment 1, the magnetic clock pattern 42 and unique pattern 43 are formed on the disk surface by etching, but these may be magnetized patterns recorded on the existing flat medium recorded by the magnetic recording.

(3) Embodiment 2

Figure 11:
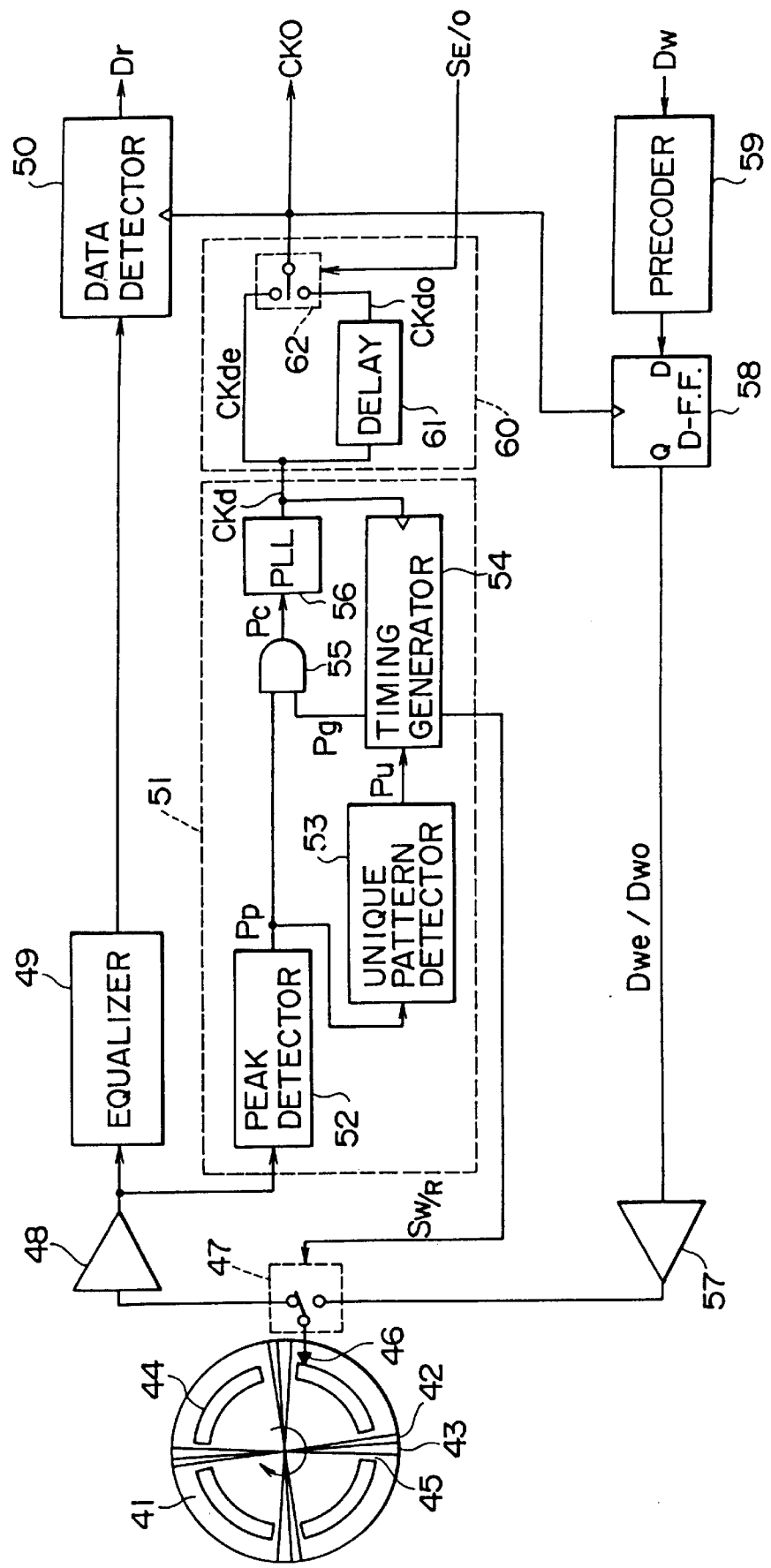
FIG. 11 illustrates a constitution indicating an embodiment 2 of the present invention.

In FIG. 11, recording and playback of data are carried out through a magnetic head 46. The operation mode thereof is selected with a recording/playback selecting switch 47. A data playback circuit system is formed by a playback amplifier 48, an equalizer 49 and a data detector 50 and a playback data Dr is outputted from the data detector 50.

The clock generating circuit 51 generates a clock (hereinafter referred to as external clocks) CK0 synchronized with rotation of disk from the reproduced signal of the unique pattern 43 and magnetic clock pattern 42 as the reference for the timing of the data circuit system as a whole.

Figure 12:
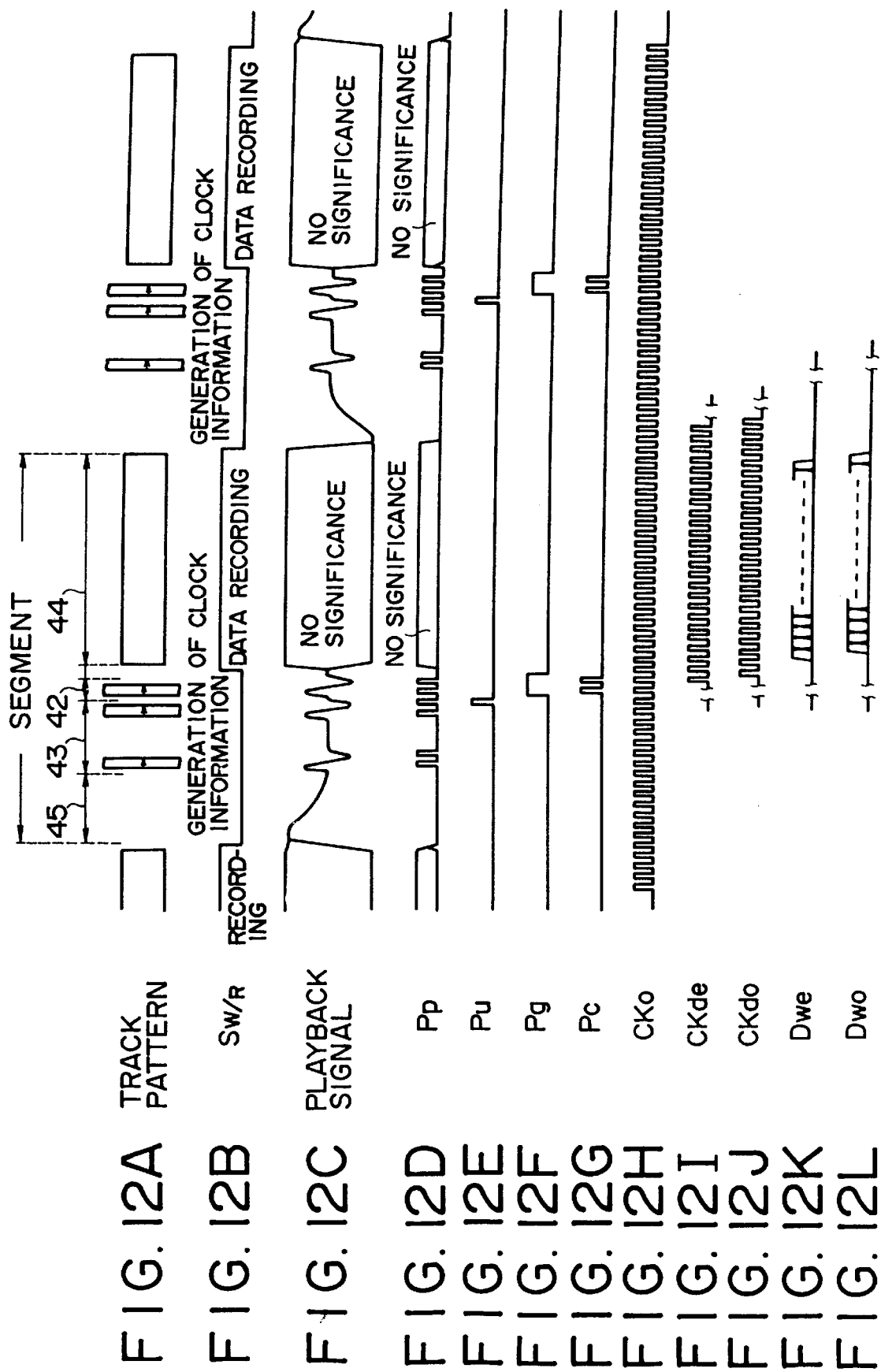
FIGS. 12a–l illustrate an operation timing in the data recording mode of the embodiment 2.

Next, operations in the data recording mode will be explained by referring to FIG. 11 and FIG. 12.

In FIG. 12A, a part of concentric tracks on the disk surface is shown in the form of a straight line to illustrate a track pattern. A track is formed by repetition of segment consisting of a gap 45, a unique pattern 43, a magnetic clock pattern 42 and a data segment 44.

For recording synchronously with the magnetic clock pattern 42 in the data recording mode, playback of the unique pattern 43 and magnetic clock pattern 42 and data recording to data segment 44 must be repeated alternately. Therefore, the selection switch 47 is controlled by the recording/reproduction control signal SW/R (illustrated as FIG. 12B) outputted from the timing generator 54 of the clock generating circuit 51.

When the control signal SW/R is high level, the magnetic head 46 is connected to the recording amplifier 57 for data recording to the data segment 44. Meanwhile, the control signal SW/R is low level, the magnetic head 46 is connected to the playback amplifier 48 to reproduce the unique pattern 43 and magnetic clock pattern 42 and this reproduced signal is supplied to the clock generating circuit 51.

The clock generating operation in the data recording mode is as follows. As the initial condition, an external clock CK0 (illustrated as FIG. 12H) outputted from the clock generating circuit 51 is assumed to be correctly synchronized with the magnetic clock pattern 42 on the disk surface. At the beginning, the control signal SW/R is low level and the magnetic head 46 is connected with the playback amplifier 48 and—a reproduced signal having the isolated waveform corresponding to the unique pattern 43 and magnetic clock pattern 42 can be obtained from the playback amplifier 48 (illustrated as FIG. 12C).

This reproduced signal is supplied to the peak detector 52 forming the clock generating circuit 51 to obtain the peak detecting pulse Pp corresponding to the isolated waveform (illustrated as FIG. 12D). This detecting pulse Pp is supplied to the unique pattern detector 53. The unique pattern detector 53 detects an existing time of unique pattern and outputs the unique pattern detecting pulse Pu (illustrated as FIG. 12E). This detecting pulse Pu is supplied to the timing generator 54.

The timing generator 54 is a sequencer which operates synchronously with the external clock CK0 with the period of existing interval of the magnetic clock pattern 42. The internal condition of the timing generator 54 is initialized for each input of the detecting pulse Pu. This timing generator 54 generates a clock gate pulse Pg (illustrated as FIG. 12F). This gate pulse Pg and the detecting pulse Pp from the peak detector 52 are supplied to the AND circuit 55, which outputs a clock pattern detecting pulse Pc (illustrated as FIG. 12G). This detecting pulse Pc is obtained by removing unnecessary pulses not corresponding to the magnetic clock pattern 42 from the peak detecting pulse Pp sent from the peak detector 52.

The detecting pulse Pc outputted from the AND circuit 55 is supplied to PLL 56 as the synchronization reference signal and PLL 56 forms an external clock CK0 synchronized with the detecting pulse Pc including jitter due to wow or flutter of the magnetic disk 41. This external clock CK0 is supplied to the timing generator 54 to give internal condition transition timing.

When the period of magnetic clock pattern 42 has passed, the control signal SW/R outputted from the timing generator 54 is changed to-high level (illustrated as FIG. 12B) and-data recording to the data segment 44 is carried out. At this time, the selection switch 47 is switched to connect the magnetic head 46 to the recording amplifier 57. Thereby, the recording data Dw is supplied to the magnetic head 46 through the precoder 59, D-flipflop 58 and recording amplifier 57 to realize recording of the recording data Dw into the data segment 44. While the recording data Dw is recorded, an output signal of the playback amplifier 48 has no significance (illustrated as FIG. 12C), but no problem is created because the output signal is not used for generation of the clock at this point.

When the predetermined time corresponding to the one data segment length (data existing point clock unit) has passed, the control signal SW/R outputted from the timing generator 54 becomes low level again. Thereby, the selection switch 47 is switched and the reproduced signals of the unique pattern,43 and magnetic clock pattern 42 are supplied to the clock generating circuit 51 for continuous generation of the clock.

As explained above, in the data recording model reproduction of the unique pattern 43 and magnetic clock pattern 42 for generating external-clock CK0 and data recording to data segment 44 are repeated alternately.

Next, phase management of recording data between adjacent tracks will then be explained.

In FIG. 11, the data existing point clocks CKde and CKdo, having the phases inverted with each other depending on even and odd recording object track numbers, are generated (illustrated as FIG. 12I, J) by a phase control circuit 60 from the external clock CK0 synchronized with rotation of magnetic disk 41. When a track number is an even number, the external clock CK0 is used directly as the data existing point clock CKde. When a track number is given by an odd number, the external clock CK0 is delayed for ½ bit by a delay circuit 61 and this delayed clock is used, as the data existing point clock CKdo. These data existing point clocks CKde, CKdo are supplied to the selection switch 62 to control the selecting operation mode depending on a signal SE/O, which indicates an even/odd track number, and is then outputted as the data existing point clock CKd. This data existing point clock CKd is supplied as a bit clock to the D-flipflop 58 to which the recording data Dw is inputted.

Thereby, when the track number is defined by an even number, the recording data Dwe is generated by the D-flipflop 58 in the timing shown in FIG. 12K in synchronization with the data existing point clock Me and moreover it is converted into a recording current by the recording amplifier 57 and is then recorded in the data segment 44.

When the track number is defined by an odd number, the recording data Dwo is generated and recorded in the timing shown in FIG. 12L in synchronization with the data existing point clock CKdo having the inverted phase. Accordingly, the recording data Dwe, Dwo are recorded in such a manner that a phase of magnetization pattern is different by 180 degrees between the adjacent tracks on the disk surface.

In the case of recording data in such a manner that phase of magnetized pattern is different by 90 degrees, the data existing point clocks CKd1 to CKd4 are generated by delaying the external clock CK0 for ¼ bit respectively with delay circuits 61a to 61c shown in FIG. 13. In this case, switching operation of the switch 62 is controlled based on the signal STR indicating the track numbers 4n+1, 4n+2, 4n+3, 4n+4 (n=0, 1, 2, 3, . . . ).

The data existing point clock CKd outputted from the selection switch 62 is also supplied to the data detector 50. The recording magnetized patterns of all tracks are synchronized with the magnetic clock pattern 42. Therefore, data can be detected without error even in the data playback mode by giving the data detection timing with the data existing point clock CKd (CKde, CKdo) synchronized with the magnetic clock pattern 42. In this case, as in the case of data recording mode, the clock having the correct phase can be selected by switching the selection switch 62 depending on the even or odd playback object track number.

Next, referring to FIG. 14, it will be explained that track-to-track crosstalk in the playback mode can be lowered and data detection errors can also be reduced by recording the recording data Dw (Dwe, Dwo) with this embodiment.

The magnetized patterns (illustrated as FIGS. 14A, C) of the adjacent tracks T1 (track number 1) and T3 (track number 3) are recorded with deviation of 180° in the magnetization inversion phase from that of the magnetized pattern (illustrated as FIG. 14B). Therefore, the reproduced pulse positions of the reproduced signals (illustrated as FIGS. 14D, F) from the adjacent tracks T1, T3 are never overlapped with the reproduced pulse position of the reproduced signal (illustrated as FIG. 14E) from a playback object track T2. When the playback object track is replayed with the magnetic head, leakage magnetic field from the adjacent tracks is detected also by the magnetic head and crosstalk mainly consisting of low frequency element is superimposed on the inherent reproduced signal. Crosstalk (illustrated as FIGS. 14G, H) from the adjacent tracks T1, T3 is added to a reproduced signal (illustrated as FIGS. 14E) from the playback object track T2 and thereby the waveform of the reproduced signal is distorted (illustrated as FIG. 14I).

Meanwhile, in this embodiment, the pulse position corresponding to the inherent recording data is different by 180° from the position of crosstalk element. Therefore, at the times (given the marks ● in FIG. 14I) indicated by the data existing point clock CKde (illustrated as FIG. 14J), waveform distortion due to crosstalk is minimal, track-to-track crosstalk can be alleviated and data detection error may be lowered. In addition, it is also possible to make small the width of guard band between the adjacent tracks and improve recording density in the track width direction, while maintaining the quality of data detection.

In the embodiment of FIG. 11, the unique pattern 43 and magnetic clock pattern 42 are formed with etching by intermittently arranging magnetic layers for recording in the longitudinal direction of the tracks, but it is also possible to provide projected and recessed regions on the recording magnetic layer by embossing so that the recording magnetic layer becomes substantially intermittent. Moreover, such patterns may also be the magnetized patterns magnetically recorded on the recording magnetic layer of a flat magnetic recording medium.

Moreover, in the embodiment of FIG. 11, the one magnetic clock pattern 42 or the one unique pattern 43 is formed radially and continuously on the disk surface in common to all tracks, but it may be formed intermittently on each track, so long as it gives almost the same timing information for adjacent tracks.

Moreover, in the embodiment of FIG. 11, the data existing point clock CKdo is formed by delaying an external clock CK0 outputted from PLL circuit 56 with a delay circuit 61 to shift the recording data Dwo for odd number tracks by a fixed time as long as ½ bit from the recording data Dwe for even number tracks, but it is also possible to form the data existing point clock CK0 by controlling a duty cycle of the external clock CK0 outputted from PLL 56 to 56% and inverting polarity of this external clock CK0.

Here, the embodiment of FIG. 11 has the following problems because only one magnetic head 46 is used in common for recording and playback operations.

Figure 15:
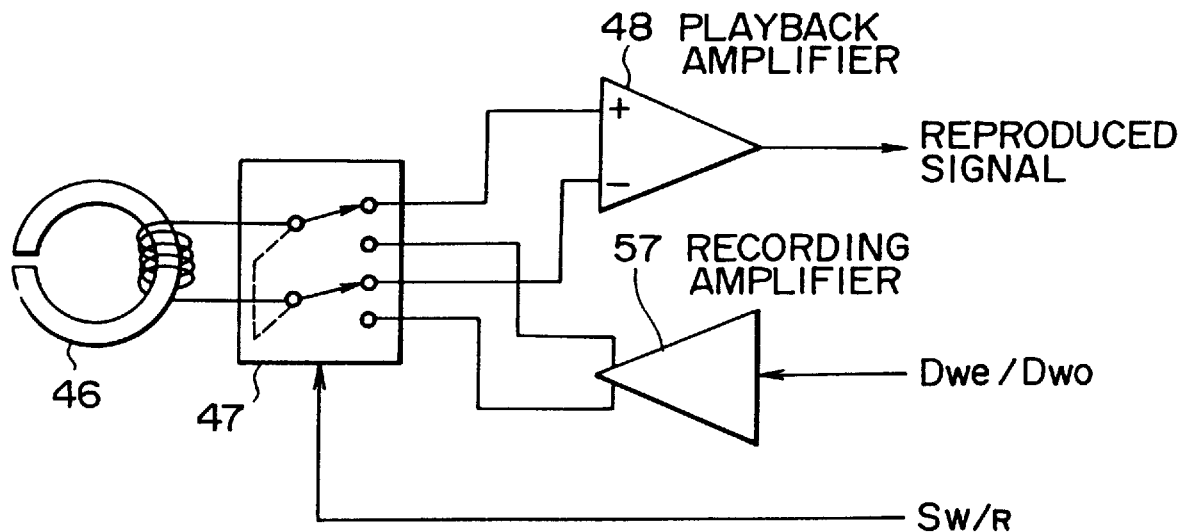
FIG. 15 illustrates a constitution of the peripheral circuits of the head.

FIG. 15 illustrates peripheral circuits of the head. A magnetic head 46 is a coil winding type head to be used in common for recording and playback operations. In the recording mode, the magnetic head 46 is connected with a recording amplifier 48 via a selection switch 47 and thereby a recording current depending on a recording data flows. FIG. 16 illustrates waveforms of such signals.

Figure 16A:
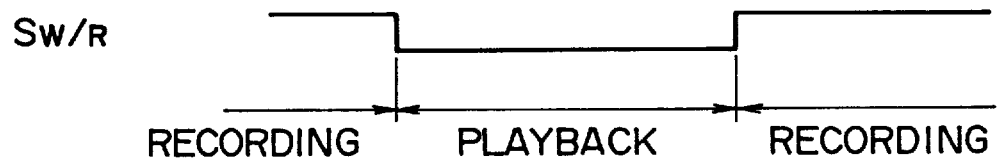
FIGS. 16a and b are illustrative shapes of waveform of a playback signal when the recording mode is changed to the playback mode.
Figure 16B:
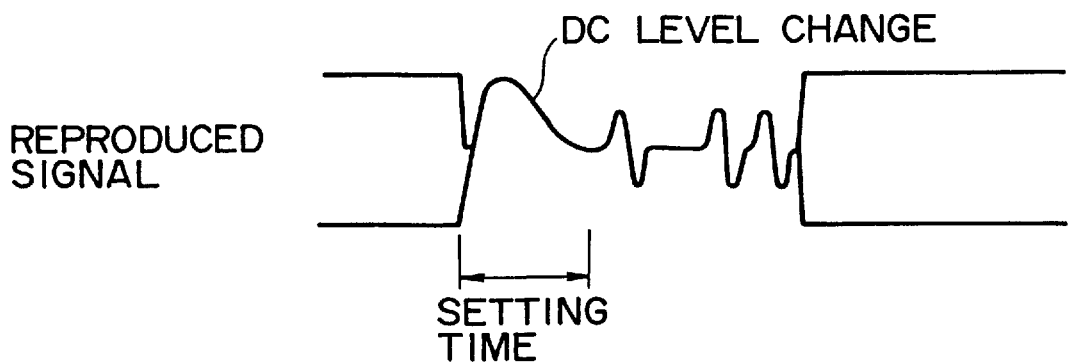

In FIG. 16, a large DC level change occurs in a reproduced signal (illustrated as FIG. 16B, a control signal SW/R is illustrated as FIG. 16A) outputted from a playback amplifier 48 when the recording is completed and the playback operation starts. As a result, an inverse electromotive force is generated in a head coil because a recording current flowing into the head coil is cut when the recording is completed and it is then connected to the playback amplifier 48 which then amplifies the playback signal. This DC level change considerably disturbs normal data playback operation. Settling of the waveform requires, typically, 5 μsec and therefore playback of data cannot be started immediately after the switching to the playback mode from the recording mode.

In view of providing for a switching time for changing from the recording mode to the playback mode, a gap 45 is provided between the data segment 44 and unique pattern 43 on the format at the disk surface (refer to FIG. 12A). This gap 45 is a waste region which cannot be used for data recording and is required individually for all segments. This waste region becomes considerably large for one track. For example, when a segment length is 25 μsec, if a gap length is 5 μsect the waste region resulting from gap reaches 20%. Since-switching to the recording mode from the playback mode is completed within several hundreds nsec, it is unnecessary to insert a particularly long gap.

(4) Embodiment 3

Figure 1:
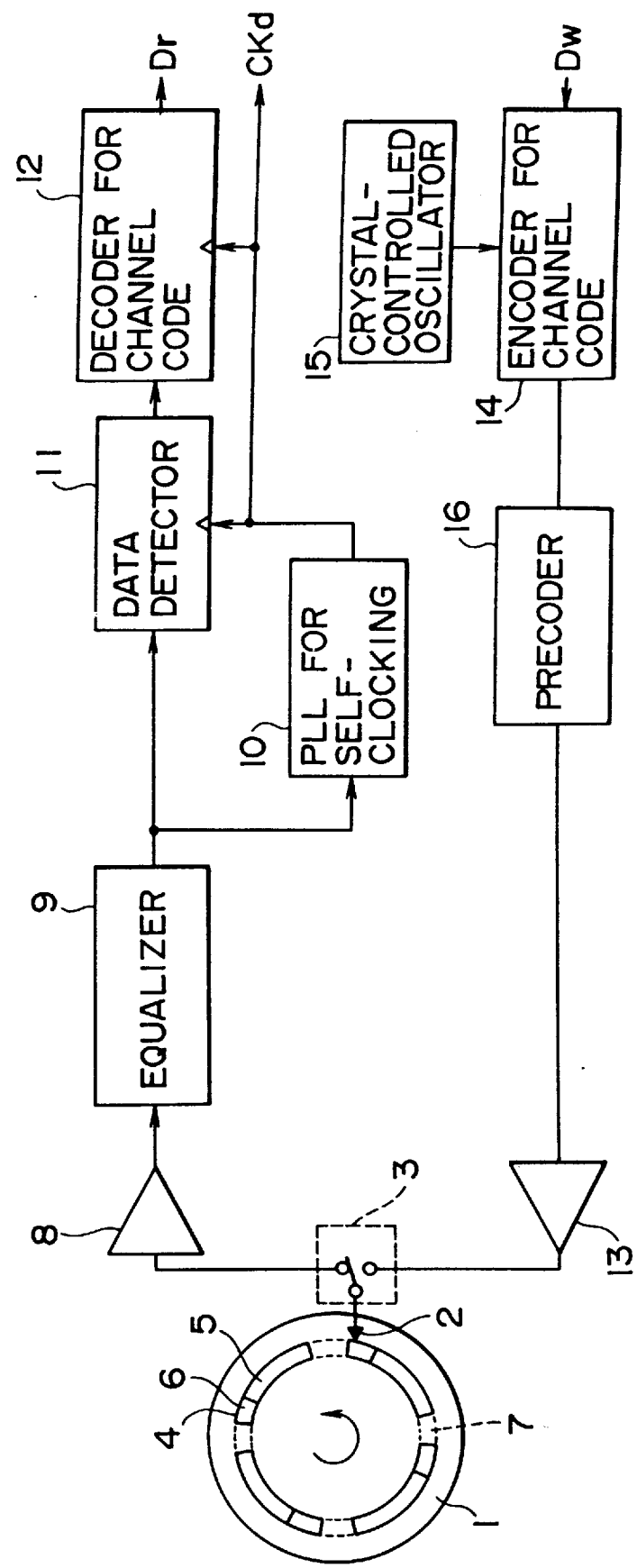
FIG. 1 illustrates a constitution indicating an example of conventional magnetic disk apparatus.
Figure 2:
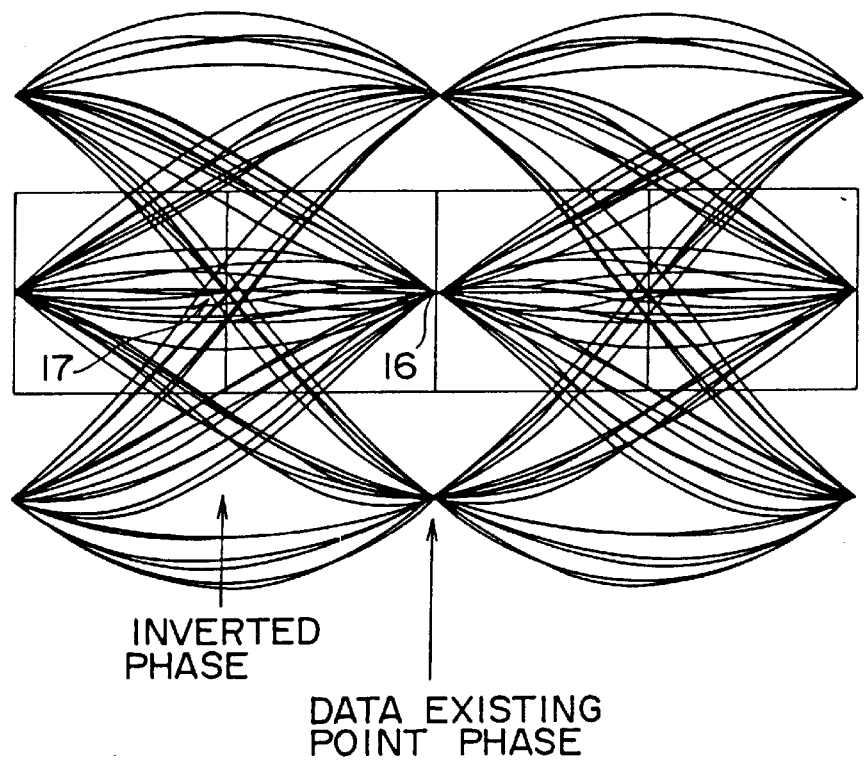
FIG. 2 illustrates an example of eye pattern in the PR (1,0,−1) channel output.
Figure 3:
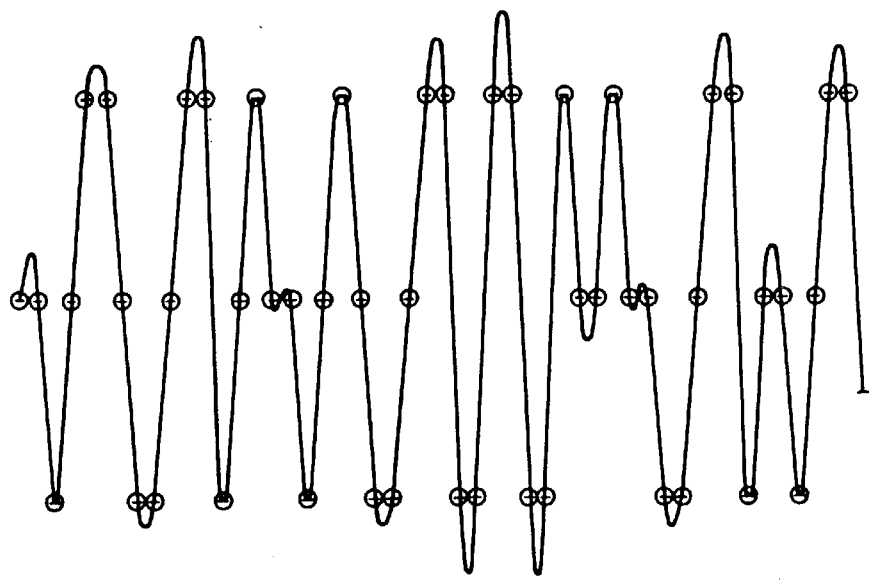
FIG. 3 illustrates an example of the RF (1,0,−1) channel output waveform.
Figure 5:
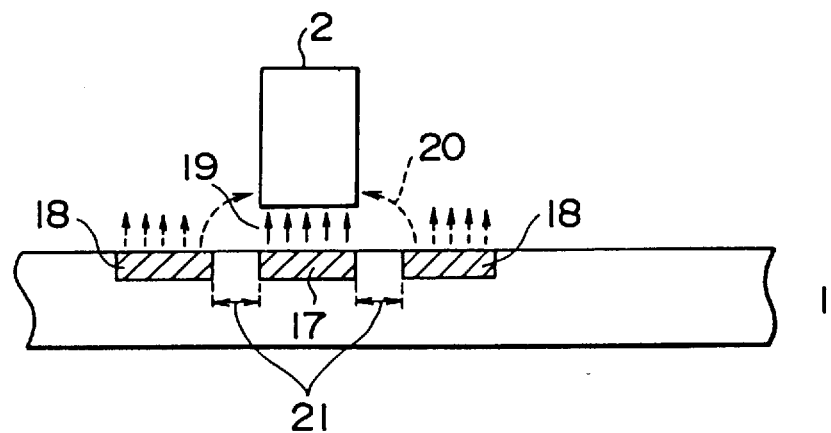
FIG. 5 is a diagram for explaining crosstalk between adjacent clocks.
Figure 17:
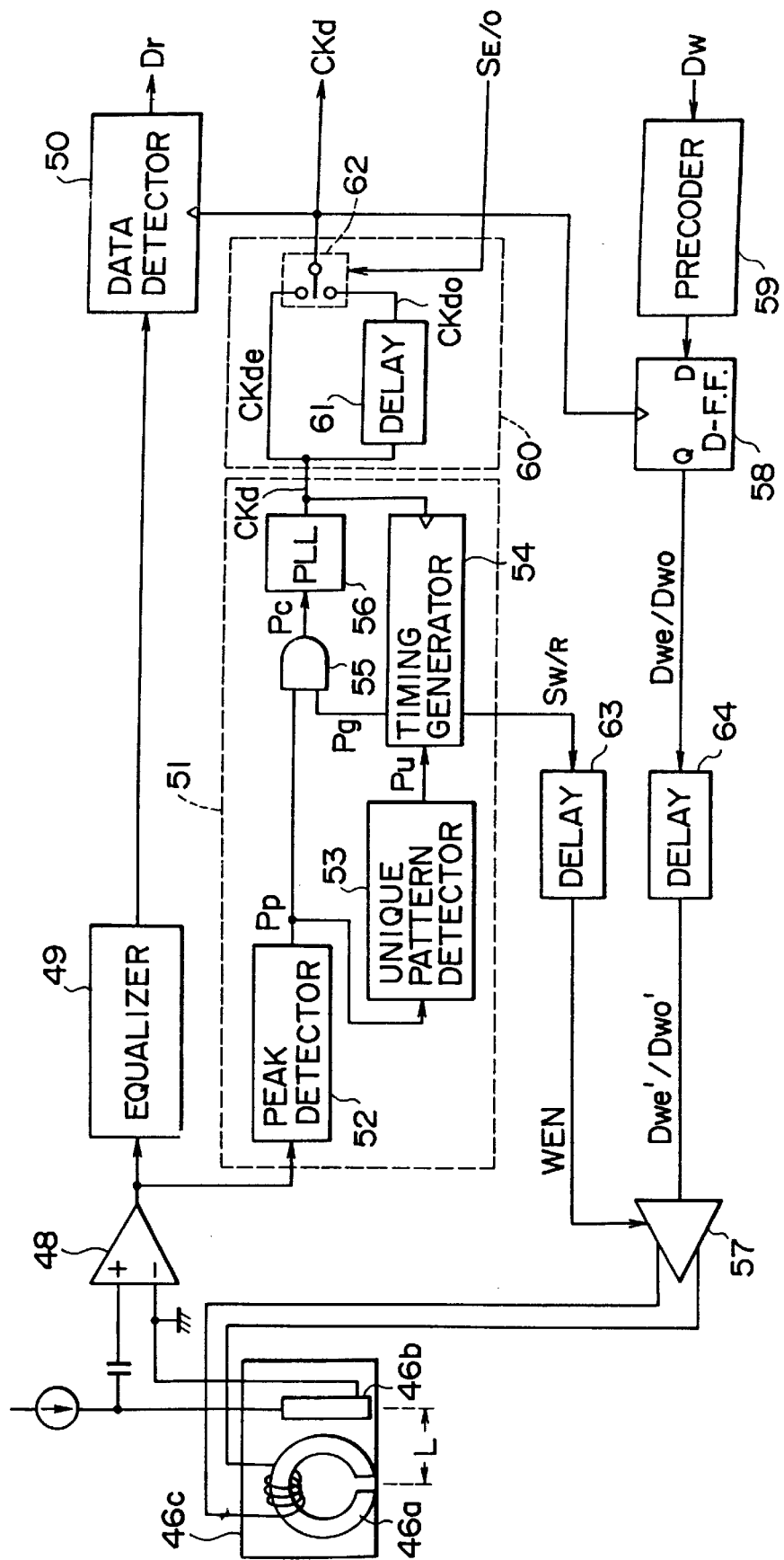
FIG. 17 illustrates a constitution of the embodiment 3 of the present invention.

FIG. 17 illustrates another embodiment of the present invention, wherein playback of data can be started immediately after the recording mode is switched to the playback mode. In FIG. 17, the elements corresponding to that of FIG. 1 are designated by the same reference numerals or symbols and detailed description of these elements is omitted here.

In embodiment 3, in place of the magnetic head 46 for common use of recording and playback operations, as indicated in the embodiment of FIG. 11, a winding coil type magnetic recording head 46a and a magnetic resistance effect type (MR) magnetic playback head 46b are provided in a rigid head support 46c. These heads 46a, 46b are arranged in the longitudinal direction of track keeping a separation distance L therebetween.

When a relative speed-between the heads 46a, 46b and the magnetic disk 41 (refer to FIG. 11) is defined as V, a time difference T=L/V exists between a track pattern (illustrated as FIG. 18A) viewed from the playback head 46b and a track pattern (illustrated as FIG. 18E) viewed from the recording head 46a.

Moreover, the recording head 46a is connected directly to a recording amplifier 57, while the playback head 46b is connected directly to a playback amplifier 48. A recording/reproduction control signal SW/R (illustrated as FIG. 18D) outputted from a timing generator 54 of a clock generating circuit 51 is delayed-by the time T in a delay circuit 63 and thereafter it is supplied to the recording amplifier 57 as a write enable signal WEN (illustrated as FIG. 18F). When the write enable signal WEN is in the high level, the recording amplifier 57 operates causing a recording current to flow into the recording head 46a. Meanwhile, when the write enable signal WEN is in the low level, the recording amplifier 57 is controlled so that any recording current does not flow into the recording head 46a.

On the other hand, the recording data Dwe, Dwo (a recording data Dwe is illustrated as FIG. 18G) outputted from a D-flipflop 58 are once delayed (a delayed recording data Dwe' is illustrated as FIG. 18H) for the time T by a delay circuit 64 and then supplied to the recording amplifier 57.

FIG. 18B is a reproduced signal outputted from the playback amplifier 48F while FIG. 18C is an external clock CK0 (data existing point clock CKde for even number track), outputted from PLL 56.

This embodiment has a constitution explained above and the other embodiments have the constitutions similar to that of the embodiment shown in FIG. 11.

In this embodiment 3, a clock generating circuit 51 also operates based on the portions corresponding to the unique pattern 43 and magnetic clock pattern 42 of the reproduced signal outputted from the playback amplifier 48 to generate an external clock CK0 (illustrated as FIG. 18C). Simultaneously, the recording/reproduction control signal SW/R is also generated (illustrated as FIG. 18D) synchronously with this external clock CK0.

In the data recording mode, as in the case of an example of FIG. 11, the recording data Dw is synchronized with the data existing point clock CKd by the D-flipflop 58 to generate the recording data Dwe, Dwo. Since the recording data Dwe1 Dwo are synchronized with the data existing point clock CKd setting its reference position at the playback head 46b, if it is assumed that the recording data Dwe, Dwo are supplied directly to the recording amplifier 57, as in the embodiment of FIG. 11, recording in the correct phase at the position of recording head 46a is impossible.

On the other hand, in this embodiment the recording data Dwe, Dwo are delayed for the time T (time corresponding to a gap between the heads 46a, 46b) by the delay circuit 64 and then supplied to the recording amplifier 57 and the signal WEN, which is delayed for the time T from the control signal Sw/R by the delay circuit 63, is also supplied to the recording amplifier 57 as an enable signal. Therefore, data recording can also be realized in the same phase as the data existing point clock CKd even when the recording head 46a is provided at the position different from the position of the playback head 46b for clock generation. That is, data recording to the data segment 44 can be realized on the tracks in the same phase as the edge of the magnetic clock pattern 42.

In the case of data playback mode, data exists at the time indicated by the data existing point clock CKd in the reproduced signal of the data segment 44 and thereby the data detector 50 can accurately detect data.

Figure 18:
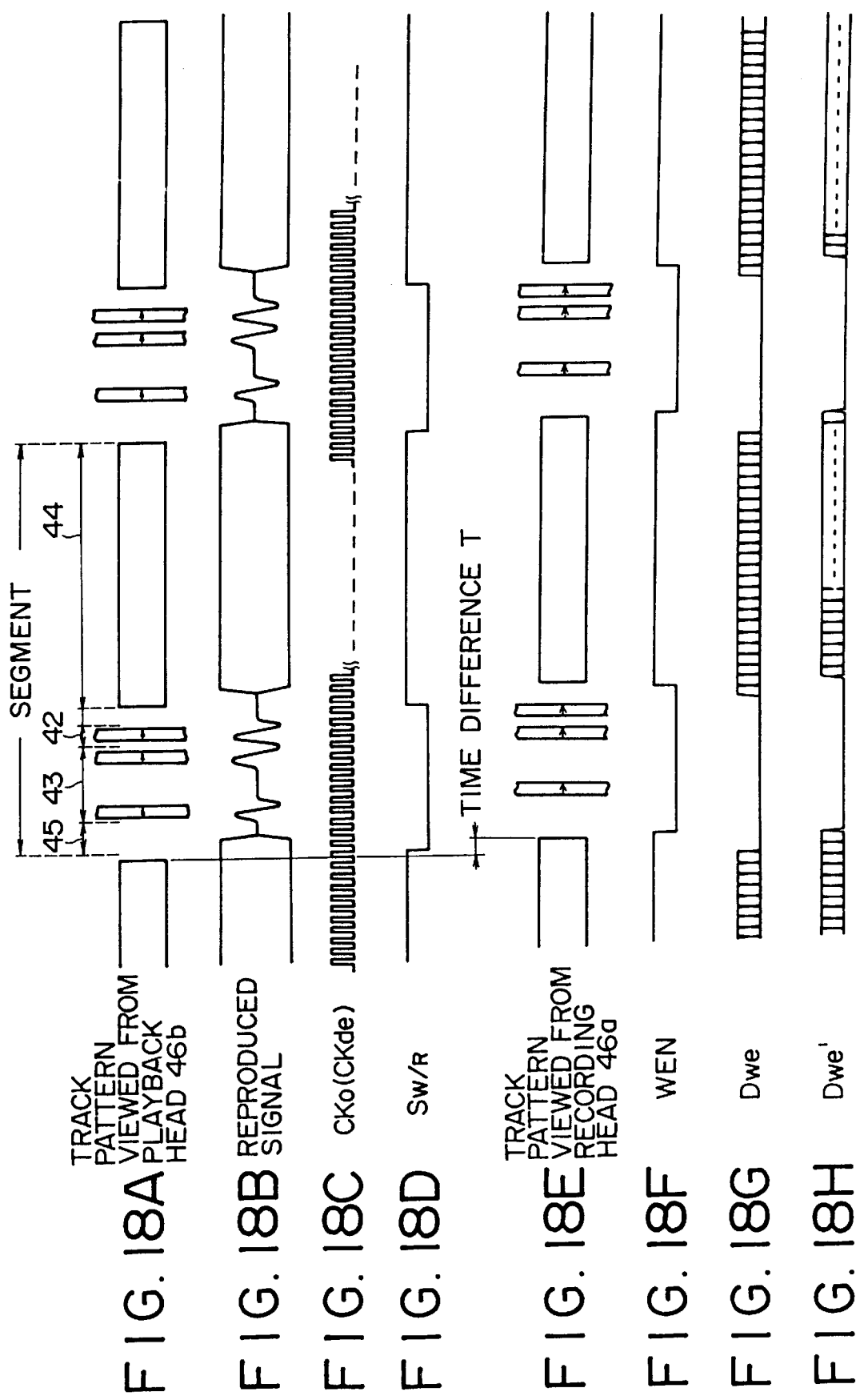
FIGS. 18a–h illustrate an operation timing in the data recording mode of the embodiment 3.

In this embodiment, the recording head 46a and playback head 46b are provided individually and each head is connected directly to the recording amplifier 57 and playback amplifier 48 respectively. Therefore, mode switching by the selection switch 47 which is conducted in the embodiment of FIG. 11 is not carried out. As a result, an inverse electromotive force never prevents settling of the reproduced waveform when the recording operation is completed. Accordingly, as shown in FIG. 18, the waveform of the reproduced signal is already stable immediately after the enable signal WEN changes to the low level from the high level, completing the recording operation.

Therefore, according to this embodiment, the length of a gap 45 can be reduced remarkably, in comparison with the case where a magnetic head 46 is used in common for both recording and playback operations as in the embodiment of FIG. 11, and recording—density in the longitudinal direction of the tracks can be improved.

In the embodiment of FIG. 17, since the heads 46a and 46b are provided with the distance L therebetween, a certain gap is necessary to absorb a time difference T between both heads. For example, when L-5 $\mu$m and V 10 m/s, the time difference T is 0.5 $\mu$s.

This time difference is sufficiently small value in comparison with the waveform settling time of 5 $\mu$s after initiation of the playback operation in the embodiment illustrated in FIG. 11. From this fact, it is obvious that this embodiment realizes reduction in the length of gap 45 to about 1/10 of that required when a single recording and playback head is used.

Moreover, in the embodiment of FIG. 17, a magnetic resistance effect type (MR) head is used as a playback head 46b, but an ordinary electromagnetic induction type head may also be used. Otherwise, a head based on an other principle may be used so long as it can detect inversion of magnetization within the magnetic clock pattern 42 and data segment 44.

In the embodiment of FIG. 17, the heads 46a, 46b are proximately supported by a rigid head support 46c, but both heads may also be formed integrally under the condition that the recording/playback functions are separated. FIG. 19 illustrates an example of such constitution.

A magneto-sensitive part of MR playback head 72 is inserted into a gap in the core of a ring type recording head 71. A core 71a of the recording head 71 also operates as a shield core of the playback head 72 during the playback mode and these are integrally formed. Terminals of a coil of the ring type recording head 71 are connected directly to the recording amplifier 57 and terminals of the MR playback head 72 are also connected directly to the playback amplifier 48. Accordingly, since a recording current is not turned off when the recording mode is switched to the playback mode, the playback operation by the MR playback head 72 can be initiated as in the embodiment of FIG. 17.

Moreover, in the embodiment of FIG. 17, the magnetic clock pattern 42 and unique pattern 43 are radially and continuously formed on the disk surface but these may also be formed intermittently for each track or every several tracks.

In addition, in the embodiment of FIG. 17, the magnetic clock pattern 42 and unique pattern 43 are formed on the disk surface by the etching process but these may be magnetized patterns recorded by the magnetic recording method on the recording magnetic layer of the existing flat recording medium.

In the embodiments described above, a recording medium has been applied to a disk apparatus to create a magnetic disk, but the type of recording medium is not limited to a magnetic disk and the recording medium can absolutely be applied to the other digital magnetic recording/playback apparatus.

(5) Effect of the Embodiments a) According to the present invention, the following results may be obtained because the data existing point clock is generated on the basis of the reproduced signal of the magnetic clock pattern region independent of the data region on the disk surface.

First, in comparison with an existing self-clocking system, a clock generating circuit is more simplified.

Second, in comparison with the existing system, the bit data detection error rate resulting from clock accuracy becomes small and high reliability of a magnetic disk apparatus can be realized since a high precision clock can be obtained without relation to contents of recording data.

Third, channel encoding for holding-the clock element which has been essential in the existing system is no longer necessary and the quantity of effective recording data on the disk surface can be increased.

b) According to the present invention, the following results may also be obtained because a phase difference of the recorded magnetized patterns between adjacent tracks can be kept within a predetermined relationship.

First, data detection error during the playback mode due to crosstalk between adjacent tracks can be reduced by controlling the phase difference between adjacent tracks so that data detection error during the playback operation due to crosstalk between adjacent tracks is minimized.

Second, recording density can be improved because track-to-track distance can be shortened and a guard band width-can also be reduced without increasing the error rate.

c) Moreover, according to the present invention, the playback operation can be initiated immediately after switching from the recording mode to the playback mode, because the recording head and playback head are provided individually and the recording and playback operation modes are not switched at the head terminals. Accordingly, a gap length between the data region and clock information recording region can be shortened recording density in the longitudinal direction of the tracks can be improved and recording capacity of a recording medium can be increased.

What is claimed is:

1. A magnetic disk apparatus comprising:

a magnetic disk having a magnetic clock pattern region for providing a common timing reference between a data recording region and adjacent tracks and a set of several magnetic patterns region for specifying a circumferential position of said magnetic clock pattern, wherein the magnetic clock pattern region and set of several magnetic patterns region are formed independently of each other on the magnetic disk, such that the magnetic clock pattern region and set of several magnetic patterns regions produce isolated waveforms when read;

a magnetic recording head for recording data on said magnetic disk;

a magnetic playback head provided separately from said magnetic recording hear to reproduce data from said magnetic disk;

clock generating means for generating a data existing point clock using the reproduced signals of said magnetic clock pattern region and set of several magnetic patterns region of said magnetic disk;

data detecting means for detecting data from the reproduced signal of the data region of said magnetic disk in synchronization with a data existing point clock generated by said clock generating means; and recording means for driving said magnetic disk to record the data in the data recording region of said magnetic disk in synchronization with a data existing point clock generated by said clock generating means.

2. A magnetic disk apparatus comprising:

a magnetic disk having a magnetic clock pattern region for providing a common timing reference between a data recording region and adjacent tracks and a set of several magnetic patterns region for specifying a circumferential position of said magnetic clock pattern, wherein the magnetic clock pattern region and set of several magnetic patterns region are formed independently of each other on the magnetic disk, such that the magnetic clock pattern region and set of several magnetic patterns region produce isolated waveforms when read;

a magnetic recording head for recording data on said magnetic disk;

a magnetic playback head provided separately from said magnetic recording head to reproduce data from said magnetic disk;

clock generating means for generating a data existing point clock using the reproduced signals of said magnetic clock pattern region and set of several magnetic patterns region of said magnetic disk;

signal generating means for generating a data recording timing signal from a data existing point clock generated by said clock generating means;

data detecting means for detecting data from the reproduced signal of the data region of said magnetic disk in synchronization with a data existing point clock generated by said clock generating means;

synchronous means for synchronizing data to be recorded with a data existing point clock generated by said clock generating means;

first delay means for delaying said timing signal for a time difference generated depending on the distance at least between said playback head and recording head;

second delay means for delaying the data synchronized with said data existing point clock for a time difference generated depending on the distance at least between said playback head and recording head; and second delay means for delaying the data synchronized with said data existing point clock for a time difference generated depending on the distance at least between said playback head and recording head; and a recording means for driving, wherein said data recording means drives, in synchronization with a timing signal delayed by said first delay means, said magnetic recording head to record the data delayed by said second delay means in to said data recording region.

3. A magnetic disk apparatus according to claim 2, further comprising a second clock generating means for generating a second data existing point clock having a constant phase difference for each adjacent track from a data existing point clock generated by said clock generating means, thereby recording data using the second data existing point clock generated by said clock generating means.

4. A magnetic disk apparatus according to claim 3, wherein said magnetic clock pattern region and set of several magnetic patterns region are existing among a plurality of data recording regions arranged on said tracks.

5. A magnetic disk apparatus according to claim 2, wherein said playback head is a magnetic resistance effect type magnetic playback head.

6. A magnetic disk apparatus according to claim 2, wherein said magnetic recording head and magnetic playback head are proximately formed on one rigid body.

7. A magnetic disk apparatus comprising:

a magnetic disk having a magnetic clock pattern region for providing a common timing reference between a data recording region and adjacent tracks and a set of several magnetic patterns region for specifying a circumferential position of said magnetic clock pattern, wherein the magnetic clock pattern region and set of several magnetic patterns region are formed independently of each other on the magnetic disk by etching a surface of the magnetic disk, such that the magnetic clock pattern region and a set of several magnetic patterns region produce isolated waveforms when read;

a magnetic recording head for recording data on said magnetic disk;

a magnetic playback head provided separately from said magnetic recording head to reproduce data from said magnetic disk;

clock generating means for generating a data existing point clock using the reproduced signals of said magnetic clock pattern region and set of several magnetic patterns region of said magnetic disk;

data detecting means for detecting data from the reproduced signal of the data region of said magnetic disk in synchronization with a data existing point clock generated by said clock generating means; and recording means for driving said magnetic disk to record the data in the data recording region of said magnetic disk in synchronization with a data existing point clock generated by said clock generating means.

8. A magnetic disk apparatus comprising:

a magnetic disk having a magnetic clock pattern region for providing a common timing reference between a data recording region and adjacent tracks and a set of several magnetic patterns region for specifying a circumferential position of said magnetic clock pattern, wherein the magnetic clock pattern region and set of several magnetic patters region are formed independently of each other on the magnetic disk by etching a surface of the magnetic disk, such that the magnetic clock pattern region and set of several magnetic patterns region produce isolated waveforms when read;

a magnetic recording head for recording data on said magnetic disk;

a magnetic playback head provided separately from said magnetic recording head to reproduce data from said magnetic disk;

clock generating means for generating a data existing point clock using the reproduced signals of said magnetic clock pattern region and set of several magnetic patters region of said magnetic disk;

signal generating means for generating a data recording timing signal from a data existing point clock generated by said clock generating means;

data detecting means for detecting data from the reproduced signal of the data region of said magnetic disk in synchronization with a data existing point clock generated by said clock generating means;

synchronous means for synchronizing data to be recorded with a data existing point clock generated by said clock generating means;

first delay means for delaying said timing signal for a time difference generated depending on the distance at least between said playback head and recording head;

second delay means for delaying the data synchronized with said data existing point clock for a time difference generated depending on the distance at least between said playback head and recording head; and a recording means for driving, wherein said data recording means drives, in synchronization with a timing signal delayed by said first delay means, said magnetic recording head to record the data delayed by said second delay means into said data recording region.

9. A magnetic disk apparatus according to claim 8, further comprising a second clock generating means for generating a second data existing point clock having a constant phase difference for each adjacent track from a data existing point clock generated by said clock generating means, thereby recording data using the second data existing point clock generated by said clock generating means.

10. A magnetic disk apparatus according to claim 8, wherein said playback head is a magnetic resistance effect type magnetic playback head.

11. A magnetic disk apparatus according to claim 8, wherein said magnetic recording head and magnetic playback head are proximately formed on one rigid body.

12. A magnetic disk apparatus according to claim 8, wherein said magnetic clock pattern region and set of several magnetic patterns region are existing among a plurality of data recording regions arranged on said tracks.

13. A magnetic disk apparatus comprising:

a magnetic disk having a magnetic clock pattern region for providing a common timing reference between a data recording region and adjacent tracks and a set of several magnetic patterns region for specifying a circumferential position of said magnetic clock pattern, wherein the magnetic clock pattern region and set of several magnetic patterns region are formed independently of each other on the magnetic disk by embossing a surface of the magnetic disk, such that the magnetic clock pattern region and set of several magnetic patterns region produce isolated waveforms when read;

a magnetic recording head for recording data on said magnetic disk;

a magnetic playback head provided separately from said magnetic recording head to reproduce data from said magnetic disk;

clock generating means for generating a data existing point clock using the reproduced signals of said magnetic clock pattern region and set of several magnetic patters region of said magnetic disk;

data detecting means for detecting data from the reproduced signal of the data region of said magnetic disk in synchronization with a data existing point clock generated by said clock generating means; and recording means for driving said magnetic disk to record the data in the data recording region of said magnetic disk in synchronization with a data existing point clock generated by said clock generating means.

14. A magnetic disk apparatus comprising:

a magnetic disk having a magnetic clock pattern region for providing a common timing reference between a data recording region and adjacent tracks and a set of several magnetic patterns region for specifying a circumferential position of said magnetic clock pattern, wherein the magnetic clock pattern region and set of several magnetic patterns region are formed independently of each other on the magnetic disk by embossing a surface of the magnetic disk, such that the magnetic clock pattern region and set of several magnetic patterns region produce isolated waveforms when read;

a magnetic recording head for recording data on said magnetic disk;

a magnetic playback head provided separately from said magnetic recording head to reproduce data from said magnetic disk;

clock generating means for generating a data existing point clock using the reproduced signals of said magnetic clock pattern region and set of several magnetic patterns region of said magnetic disk;

signal generating means for generating a data recording timing signal from a data existing point clock generated by said clock generating means;

data detecting means for detecting data from the reproduced signal of the data region of said magnetic disk in synchronization with a data existing point clock generated by said clock generating means;

synchronous means for synchronizing data to be recorded with a data existing point clock generated by said clock generating means;

first delay means for delaying said timing signal for a time difference generated depending on the distance at least between said playback head and recording head;

second delay means for delaying the data synchronized with said data existing point clock for a time difference generated depending on the distance at least between said playback head and recording head; and a recording means for driving, wherein said data recording means drives, in synchronization with a timing signal delayed by said first delay means, said magnetic recording head to record the data delayed by said second delay means into said data recording region.

15. A magnetic disk apparatus according to claim 14, further comprising a second clock generating means for generating a second data existing point clock having a constant phase difference for each adjacent track from a data existing point clock generated by said clock generating means, thereby recording data using the second data existing point clock generated by said clock generating means.

16. A magnetic disk apparatus according to claim 14, wherein said playback head is a magnetic resistance effect type magnetic playback head.

17. A magnetic disk apparatus according to claim 14, wherein said magnetic recording head and magnetic playback head are proximately formed on one rigid body.

18. A magnetic disk apparatus according to claim 14, wherein said magnetic clock pattern region and set of several magnetic patterns region are existing among a plurality of data recording regions arranged on said tracks.

* * * * *